US007981373B2

(12) United States Patent
Saito et al.

(10) Patent No.: US 7,981,373 B2
(45) Date of Patent: Jul. 19, 2011

(54) REACTION DEVICE AND ELECTRONIC DEVICE

(75) Inventors: Kaoru Saito, Shiki (JP); Naotomo Miyamoto, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 315 days.

(21) Appl. No.: 11/904,289

(22) Filed: Sep. 26, 2007

(65) Prior Publication Data

US 2008/0113234 A1 May 15, 2008

(30) Foreign Application Priority Data

Sep. 27, 2006 (JP) ................................ 2006-263127

(51) Int. Cl.
*B01J 8/04* (2006.01)

(52) U.S. Cl. ........ 422/190; 422/198; 422/207; 422/211; 422/188; 422/189; 48/61; 48/127.9; 429/19; 429/20; 423/248; 423/230

(58) Field of Classification Search ..................... 48/61; 422/168–170, 198
See application file for complete search history.

(56) References Cited

U.S. PATENT DOCUMENTS 3,855,372 A * 12/1974 Koch ........................... 261/131
3,977,364 A * 8/1976 Gijsbers et al. ............... 122/366
5,759,712 A * 6/1998 Hockaday ..................... 429/423
6,896,986 B2 * 5/2005 Stukey et al. .................. 429/26
2004/0244290 A1 * 12/2004 Yamamoto et al. .......... 48/127.9
2006/0068247 A1 * 3/2006 Kuwata et al. .................. 429/20

FOREIGN PATENT DOCUMENTS

JP 2001-118595 A 4/2001
JP 2005-132712 A 5/2005
WO WO 2005/084771 A2 9/2005

OTHER PUBLICATIONS

Korean Office Action dated Feb. 12, 2009 (4 pages), and English translation thereof (3 pages) issued in counterpart Korean Application No. 1020070097311.

* cited by examiner

*Primary Examiner* — Kaity V. Handal
(74) *Attorney, Agent, or Firm* — Holtz, Holtz, Goodman & Chick, PC

(57) ABSTRACT

A reaction device can raise heat use efficiency. The reaction device includes a carbon monoxide remover removing carbon monoxide, and a vaporizer provided inside the carbon monoxide remover to vaporize fuel.

11 Claims, 17 Drawing Sheets

25j
25c
25a
25b
25g
25h
25

26a
26c
26b
26g
26h
26

27j
27c
27a
27b
27g
27h
27

28g
28a
28c
28b
28h
28

29j
29g
29a
29c
29b
29h
29

30c
30a
30g
30h
30

REACTION DEVICE AND ELECTRONIC DEVICE

BACKGROUND OF THE INVENTION

1. Field of the Invention

The present invention relates to a reaction device incorporating a carbon monoxide remover to remove carbon monoxide by oxidizing it and a vaporizer to vaporize fuel and water, and relates to an electronic device.

2. Description of Related Art

In recent years, a fuel cell has attracted attention as a clean power source having high energy conversion efficiency, and it has been developed to put the fuel cell to practical use, such as a fuel cell powered vehicle and electric home. The fuel cell is a device to generate electrical energy by an electrochemical reaction of hydrogen and oxygen, and a reaction device to generate hydrogen from a mixture gas of a fuel and water is connected to such fuel cell. For example, a reaction device (30) described in Japanese Patent Application Laid-Open Publication No. 2001-118595 includes combustors (50) and (51) each mounted in a ring shape, a vaporizer (35) installed above the combustors (50) and (51), reformers (21) and (32) provided in a scroll pattern above the vaporizer (35), and a carbon monoxide remover (34) communicating with the ends of the reformers (21) and (32) on their peripheral sides. In the reaction device, a heated gas heated by the combustors (50) and (51) flows while touching the outer side of the vaporizer (35) to heat the vaporizer (35). After that, the heated gas flows in a scroll pattern along the reformers (21) and (32) while touching the outer sides of the reformers (21) and (32) to heat the reformers (21) and (32). In the heated vaporizer (35), the fuel and the water are vaporized by being heated, and the mixture gas of the vaporized fuel and water is sent to the reformers (21) and (32). In the reformers (21) and (32), a hydrogen gas, a carbon monoxide gas, and the like, are generated from the fuel and the water, and the generated gases are sent from the reformers (21) and (32) to the carbon monoxide remover (34) In the carbon monoxide remover (34), carbon monoxide is removed by being oxidized. The hydrogen gas obtained by such a way is sent to the fuel cell, and electrical energy can be obtained in the fuel cell.

On the other hand, the research and development for mounting the fuel cell as a power source have been made also in a cellular phone, a notebook-sized personal computer, and the like, which have been being miniaturized and enhanced in their properties. If the fuel cell is mounted in a small-sized device, such as the cellular phone and the notebook-sized personal computer, not only the fuel cell but also the reaction device must be miniaturized. As a technique to miniaturize the reaction device, for example, there is a technique described in Japanese Patent Application Laid-Open Publication No. 2005-132712, where the reaction device (1) is formed by stacking a carbon monoxide remover (2c), a reformer (2b), and a vaporizer (2a) from the bottom in order. Any of the carbon monoxide remover (2c), the reformer (2b), and the vaporizer (2a) has a flow path formed by joining two substrates on each of which a groove to be the flow path is formed. Moreover, a heating element, which heats by electricity, is provided to each of the carbon monoxide remover (2c), the reformer (2b), and the vaporizer (2a). Moreover, a vacant space is formed between each of the carbon monoxide remover (2c), the reformer (2b), and the vaporizer (2a), which thereby enables to set them at optimum temperatures individually.

However, in the reaction device (30) described in the Japanese Patent Application Laid-Open Publication No. 2001-118595, the heat generated by the combustors (50) and (51) is transferred to the vaporizer (35) and the reformers (21) and (32) through the medium of the gas, and the heated gas is ejected after the gas further has heated the vaporizer (35) and the reformers (21) and (32). Consequently, heat use efficiency is bad.

Moreover, in the reaction device (1) described in the Japanese Patent Application Laid-Open Publication No. 2005-132712, the reformer (2b), the carbon monoxide remover (2c), and the vaporizer (2a) are separately heated, and no heat conduction is caused among the reformer (2b), the carbon monoxide remover (2c), and the vaporizer (2a) owing to the vacant spaces formed among them. Consequently, the heat use efficiency is bad.

SUMMARY OF THE INVENTION

The present invention was devised in order to settle the problems mentioned above.

The present invention is successful in improving heat use efficiency in a reaction device and an electronic device.

According to a first aspect of the invention, a reaction device comprises: a carbon monoxide remover to remove carbon monoxide; and a vaporizer to vaporize fuel, provided inside the carbon monoxide remover.

Preferably, the reaction device further comprises a reformer to reform the fuel vaporized by the vaporizer to generate a reformation product.

Preferably, the carbon monoxide remover includes a flow path to discharge the fuel vaporized by the vaporizer to an outside of the carbon monoxide remover, and a flow path to take in the reformation product from the reformer.

Preferably, the carbon monoxide remover is structured by stacking a plurality of plate members and frame members put between each of the plate members, and each plate member located between the frame members among the plate members is provided with a plurality of through holes; and wherein the vaporizer is inserted in the carbon monoxide remover in a stacking direction of the plate members and the frame member.

Preferably, the vaporizer includes a tube section inserted from an outer surface of the carbon monoxide remover into the inside of the carbon monoxide remover, and a liquid absorbing material to absorb liquid, with which the tube section is filled up.

Preferably, the reaction device further comprises an electric heater to heat the carbon monoxide remover and the vaporizer, the electric heater being provided inside the carbon monoxide remover.

Preferably, the reaction device further comprises a combustor to heat the carbon monoxide remover and the vaporizer, the combustor being provided inside the carbon monoxide remover.

Preferably, the reaction device further comprises a combustor provided around an end of the tube section inside the carbon monoxide remover, wherein the liquid absorbing material is filled up to a position corresponding to the combustor.

According to a second aspect of the invention, an electronic device comprises: a reaction device according to claim 1; a reformer to reform the fuel vaporized by the vaporizer to produce a reformation product; a fuel cell to generate electric power by using the reformation product; and an electronic device main body operating by the electric power supplied from the fuel cell.

BRIEF DESCRIPTION OF THE DRAWINGS

The present invention will be fully understood by the following detailed description and the attached drawings, but these are only for illustration and are not intended to limit the scope of the present invention, in which.

DETAILED DESCRIPTION OF THE PREFERRED EMBODIMENTS

In the following, the preferred embodiments for implementing the present invention are described with reference to the attached drawings. However, technically preferable various limitations for implementing the present invention are applied to the embodiments described in the following, but these limitations are not intended to limit the scope of the invention to the following embodiments and the shown examples.

First Embodiment

Figure 1:
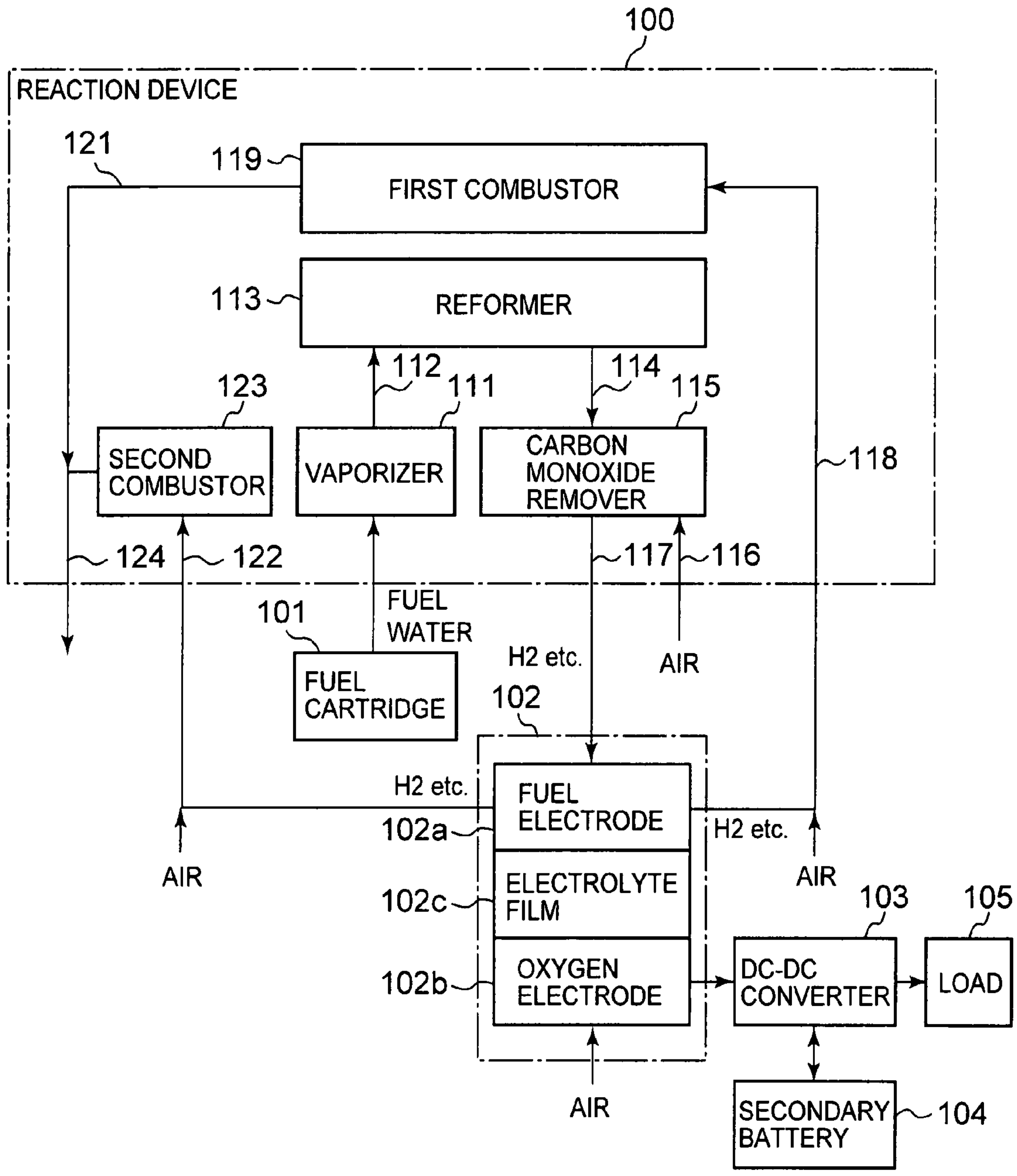
FIG. 1 is a block diagram showing a generating device using a reaction device of an embodiment to which the present invention is applied.

FIG. 1 is a block diagram showing the configurations of a reaction device 100, to which the present invention is applied, and a generating device using the reaction device 100. The generating device is the one that is equipped in an electronic device, such as a notebook-sized personal computer, a cellular phone, a personal digital assistant (PDA), an electronic personal organizer, a wrist watch, a digital still camera, a digital video camera, a game device, and an amusement machine. The generating device is used as the power source for operating the main bodies of these electronic devices.

The generating device includes the small-sized reaction device 100, a fuel cartridge 101, and a fuel cell type generator cell 102. Fuel (such as methanol, ethanol, dimethyl ether, butane, or gasoline) and water are reserved in the fuel cartridge 101 in the state of being separate from each other or being mixed with each other. The fuel and the water are supplied to the reaction device 100 in a mixed state with each other by a not-shown micropump.

The reaction device 100 includes a vaporizer 111, a reformer 113, a carbon monoxide remover 115, a first combustor 119, and a second combustor 123.

The fuel and the water that have been supplied from the fuel cartridge 101 to the reaction device 100 are sent to the vaporizer 111. The fuel and the water are vaporized in the vaporizer 111, and a mixture gas of the fuel and the water is sent from the vaporizer 111 to the reformer 113 through a flow path 112. The vaporization of the fuel and the water in the vaporizer 111 is brought about by the heat absorption of the combustion heat of the first combustor 119, the reaction heat of the carbon monoxide remover 115, and the like.

The reformer 113 produces a hydrogen gas and the like from the vaporized water and the vaporized fuel by a catalytic reaction, and further produces a carbon monoxide gas, although the quantity thereof is infinitesimal. If the fuel is methanol, then the chemical reactions of the following formulae (1) and (2) are caused in the reformer 113. Incidentally, a reaction of producing hydrogen is a heat absorption reaction, and the combustion heat of the second combustor 123 or the like is used as the heat.

$$CH_3OH+H_2O\rightarrow 3H_2+CO_2 \quad (1)$$

$$H_2+CO_2\rightarrow H_2O+CO \quad (2)$$

Reformation products such as the hydrogen gas containing the carbon monoxide produced in the reformer 113 are sent to the carbon monoxide remover 115, and the air in the outside is further sent to the carbon monoxide remover 115 through a flow path 116. The carbon monoxide remover 115 selectively removes carbon monoxide by preferentially oxidizing the secondarily produced carbon monoxide with a catalyst. The reaction of oxidizing carbon monoxide is an exothermic reaction. Incidentally, the mixture gas from which the carbon monoxide has been removed is called as a reformed gas.

The fuel cell type generator cell 102 includes a fuel electrode 102*a*, an oxygen electrode 102*b*, and an electrolyte film 102*c* put between the fuel electrode 102*a* and the oxygen electrode 102*b*. The reformed gas in the carbon monoxide remover 115 is ejected from the reaction device 100 through a flow path 117 to be supplied to the fuel electrode 102*a* of the fuel cell type generator cell 102, and the external air is further sent to the oxygen electrode 102*b*. The hydrogen in the reformed gas that has been supplied to the fuel electrode 102*a* then electrochemically reacts with the oxygen in the air supplied to the oxygen electrode 102*b* through the electrolyte film 102*c*, and thereby electric power is generated between the fuel electrode 102*a* and the oxygen electrode 102*b*. The electric power output by the fuel electrode 102*a* and the oxygen electrode 102*b* is standardized through a DC-DC converter 103, and is output to a load 105 such as the electronic device mentioned above. At this time, a secondary battery 104 may be once charged by the electric power from the fuel cell type generator cell 102, and the electric power may be output to the load 105 from the secondary battery 104 through the DC-DC converter 103.

If the electrolyte film 102*c* is an electrolyte film having hydrogen ion permeability (for example, a solid polymer electrolyte membrane), the reaction of the following formula (3) is caused at the fuel electrode 102*a*, and the hydrogen ions generated at the fuel electrode 102*a* permeate the electrolyte film 102*c* to cause the following formula (4) at the oxygen electrode 102*b*.

$$H_2\rightarrow 2H^++2e^- \quad (3)$$

$$2H^++\tfrac{1}{2}O^2+2e\rightarrow H_2O \quad (4)$$

The remaining hydrogen gas and the like that have not electrochemically reacted at the fuel electrode 102*a* are mixed with air. A mixture gas of the hydrogen gas, the air, and the like, is supplied to the first combustor 119 through a flow path 118, and is supplied to the second combustor 123 through a flow path 122. The combustors 119 and 123 combust the hydrogen gas by the catalytic reaction. Consequently, combustion heat is produced. Exhaust gas is then ejected to the outside from the second combustor 123 through a flow path 124. The exhaust gas of the first combustor 119 is sent to the flow path 124 through a flow path 121, and is further ejected to the outside through the flow path 124. Incidentally, instead of supplying the hydrogen from the fuel electrode 102*a* to the combustors 119 and 123, a gaseous fuel (such as hydrogen or methanol vapor) may be mixed with air to be separately supplied to the combustors 119 and 123.

Figure 2:
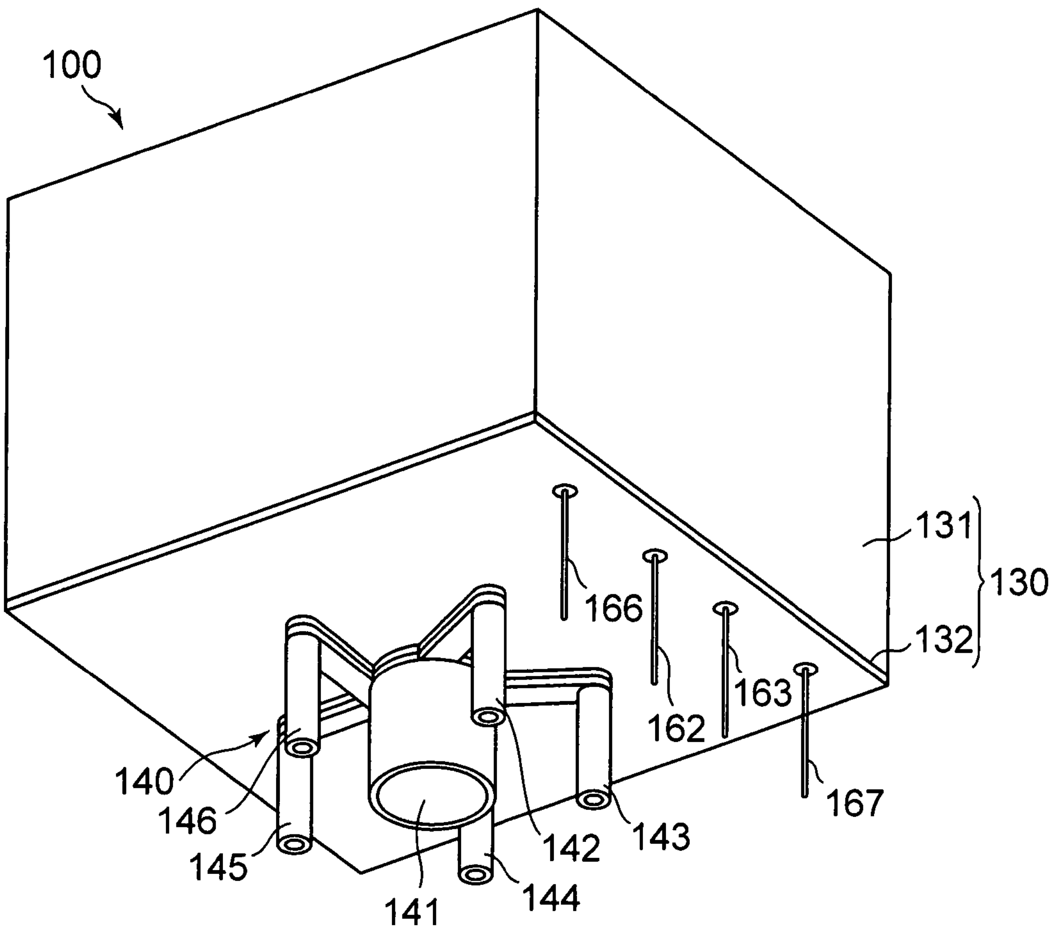
FIG. 2 is a perspective view showing the reaction device of the embodiment, to which the present invention is applied.

Next, the concrete configuration of the reaction device 100 is described. FIG. 2 is a perspective view of the reaction device 100, and FIG. 3 is an exploded perspective view of the reaction device 100.

Figure 3:
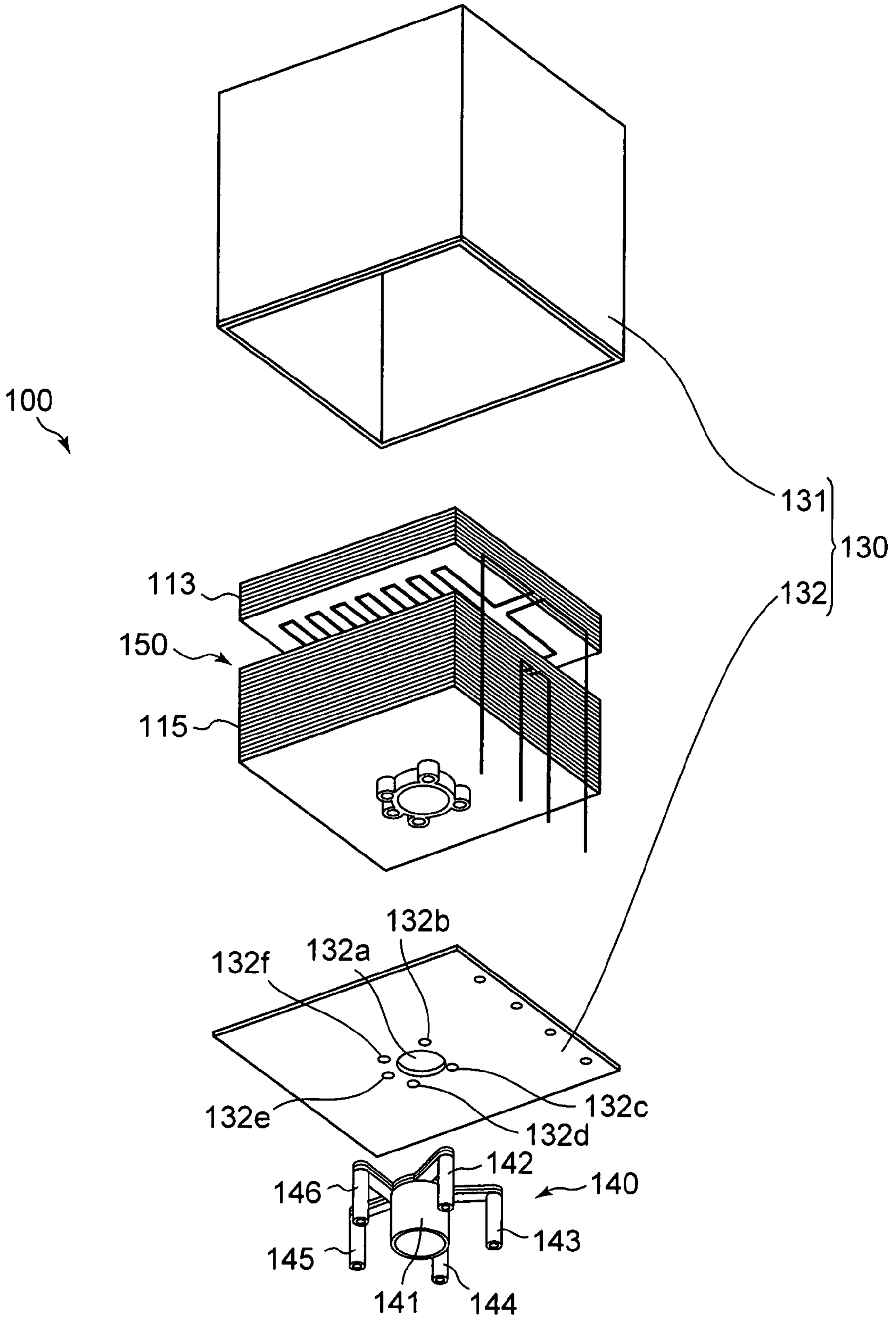
FIG. 3 is an exploded perspective view showing the reaction device in the state of being partially decomposed.

As shown in FIGS. 2 and 3, the reaction device 100 includes a heat insulating package 130 shaped in a hexahedron box, a reaction device main body 150 housed in the heat insulating package 130, and a manifold 140 attached on the under surface of the heat insulating package 130.

The manifold 140 is the one made by integrally forming a fuel introducing pipe 141, an air introducing pipe 142, a first offgas introducing pipe 143, a second offgas introducing pipe 144, a reformed gas exhausting pipe 145, and an exhaust pipe 146. The manifold 140 is made of a metal material such as stainless steel (for example, SUS 316L).

The heat insulating package 130 includes a housing 131 composed of a top plate and four side plates, and a bottom plate 132 covering the opening of the under surface of the housing 131. The housing 131 and the bottom plate 132 are severally made of a metal material such as stainless steel (for example, SUS 316L). A metallic reflection film made of aluminum, gold, silver, or copper is formed on the inner surface of the heat insulating package 130, and the heat rays and the electromagnetic waves that have emitted from the reaction device main body 150 are reflected by the metallic reflection film. Moreover, the atmosphere inside the heat insulating package 130 is made to be lower than the atmospheric pressure, and it is preferably set to one Pa or less.

A fuel introducing hole 132*a*, an air introducing pipe 132*b*, a first offgas introducing hole 132*c*, a second offgas introducing hole 132*d*, a reformed gas exhausting hole 132*e*, and an exhaust hole 132*f* penetrate the bottom plate 132. The manifold 140 is attached to the bottom plate 132 by being joined thereto. The fuel introducing pipe 141 communicates with the fuel introducing hole 132*a*; the air introducing pipe 142 communicates with the air introducing pipe 132*b*; the first offgas introducing pipe 143 communicates with the first offgas introducing hole 132*c*, the second offgas introducing pipe 144 communicates with the second offgas introducing hole 132*d*; the reformed gas exhausting pipe 145 communicates with the reformed gas exhausting hole 132*e*; and the exhaust pipe 146 communicates with the exhaust hole 132*f*.

Figure 4:
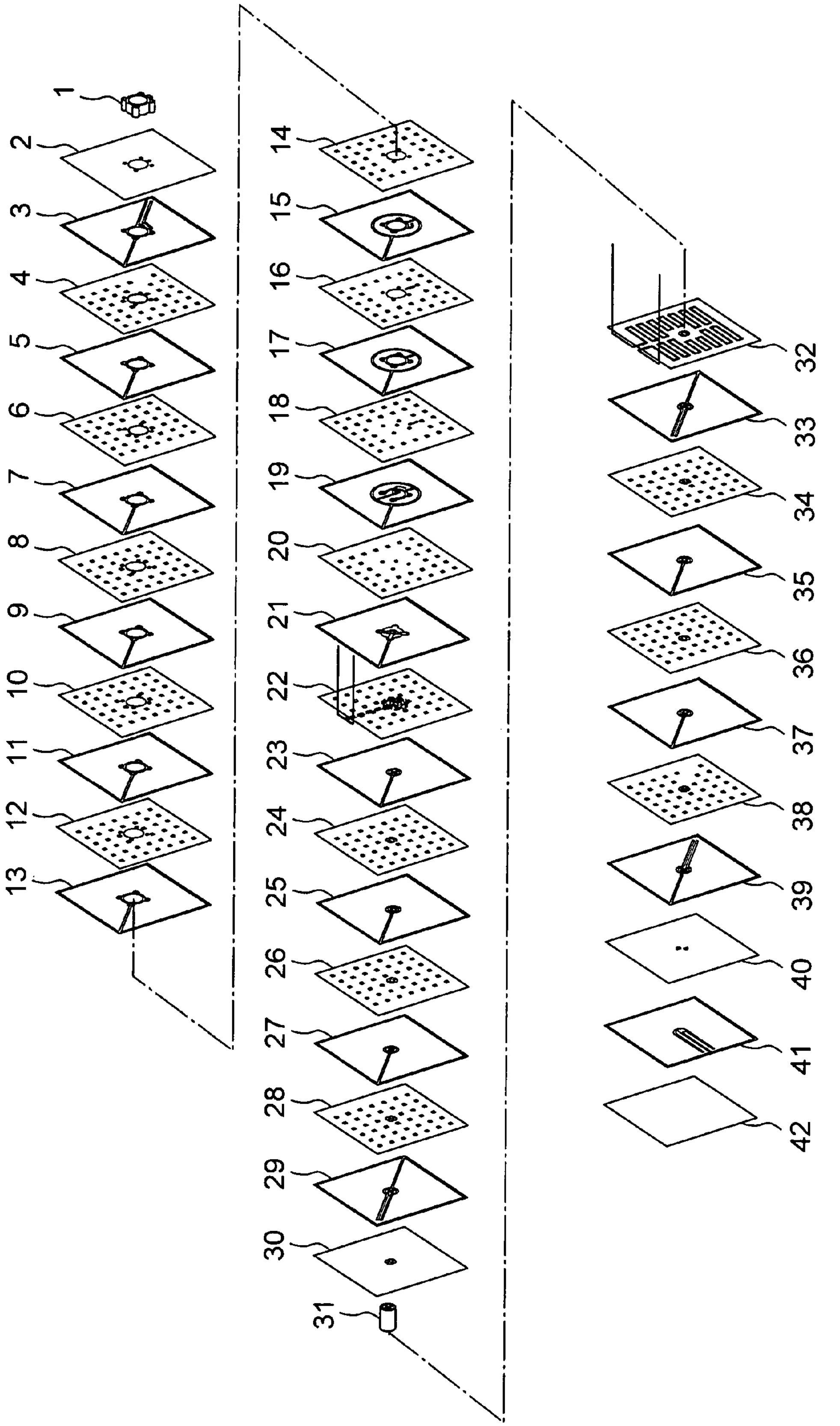
FIG. 4 is an exploded perspective view showing the main body of the reaction device in the state of being decomposed.

FIG. 4 is an exploded perspective view of the reaction device main body 150. As shown in FIG. 4, the reaction device main body 150 is a laminated body of members 1-42 made of a metal material such as stainless steel (for example, SUS 316L), and the laminated body is made by stacking the members 1-42 from the bottom in order to join them.

FIGS. 5A-5F show the bottom views of the members 1-6; FIGS. 6A-6F show the bottom views of the members 7-12; FIGS. 7A-7F show the bottom views of the members 13-18; FIGS. 8A-8F show the bottom views of the members 19-24; FIGS. 9A-9F show the bottom views of the members 25-30; FIGS. 10A-10F show the bottom views of the members 31-36; and FIGS. 11A-11F show the bottom views of the members 37-42. As shown in FIGS. 5A-5F, 6A-6F, 7A-7F, 8A-8F, 9A-9F, 10A-10F, and 11A-11F, the member 1 and the member 31 among the members 1-42 are integrally formed by bundling a plurality of pipes. The members 2, 4, 6, 8, 10, 12, 14, 16, 18, 20, 22, 24, 26, 28, 30, 32, 34, 36, 38, 40, and 42 (these are hereinafter referred to as "plate members") are severally a quadrilateral plate member, concretely a regular square plate member, and the quadrilaterals forming their outer edges when they are severally viewed in a plane view mutually coincide. The members 3, 5, 7, 9, 11, 13, 15, 17, 19, 21, 23, 25, 27, 29, 33, 35, 37, 39, and 41 (they are hereinafter referred to as "frame members") are severally a quadrilateral plate-shaped frame body, concretely a regular square plate-shaped frame body, and the shapes and the sizes of the frames of the quadrilaterals forming the external forms of the frame members when they are severally viewed in a plane mutually coincide. The frame members 3, 5, 7, 9, 11, 13, 15, 17, 19, 21, 23, 25, 27, 29, 33, 35, 37, 39, and 41 severally function as a gap member for separating a space between each of the plate members 2, 4, 6, 8, 10, 12, 14, 16, 18, 20, 22, 24, 26, 28, 30, 32, 34, 36, 38, 40, and 42, which are stacked above and below each of the frame members 3, 5, 7, 9, 11, 13, 15, 17, 19, 21, 23, 25, 27, 29, 33, 35, 37, 39, and 41, respectively, by a predetermined space. Furthermore, the quadrilaterals that form the outer edges of the members 2, 4, 6, 8, 10, 12, 14, 16, 18, 20, 22, 24, 26, 28, 30, 32, 34, 36, 38, 40, and 42 in plane view coincide with the quadrilaterals that form the outer edges of the members 3, 5, 7, 9, 11, 13, 15, 17, 19, 21, 23, 25, 27, 29, 33, 35, 37, 39, and 41, respectively. By the stacking of the members 1-42, the upper and lower sides of the frame members 3, 5, 7, 9, 11, 13, 15, 17, 19, 21, 23, 25, 27, 29, 33, 35, 37, 39, and 41 among the members 1-42 are covered, and a chamber is severally formed inside each of the frame members 3, 5, 7, 9, 11, 13, 15, 17, 19, 21, 23, 25, 27, 29, 33, 35, 37, 39, and 41.

Figure 5A:
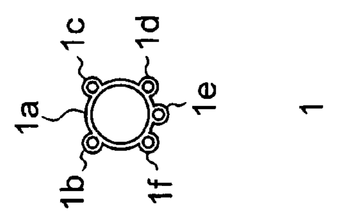
FIGS. 5A to 5F, 6A to 6F, 7A to 7F, 8A to 8F, 9A to 9F, 10A to 10F and 11A to 11F are bottom views each showing a constituent element of the main body of the reaction device.

As shown in FIG. 5A, the member 1 (hereinafter referred to as "aggregate pipe 1") is a member made by bundling an air introducing pipe 1*b*, a first offgas introducing pipe 1*c*, a second offgas introducing pipe 1*d*, and a reformed gas exhausting pipe 1*e* and exhaust pipe if with a fuel introducing pipe 1*a* put at the center to integrally form them. As shown in FIG. 3, the aggregate pipe 1 is joined on the bottom plate 132 on the inside of the heat insulating package 130. The fuel introducing pipe 1*a* communicates with the fuel introducing hole 132*a*; the air introducing pipe 1*b* communicates with the air introducing pipe 132*b*; the first offgas introducing pipe 1*c* communicates with the first offgas introducing hole 132*c*; the second offgas introducing pipe 1*d* communicates with the second offgas introducing hole 132*d*; the reformed gas exhausting pipe 1*e* communicates with the reformed gas exhausting hole 132*e*; and the exhaust pipe if communicates with the exhaust hole 132*f*.

Figure 5B:
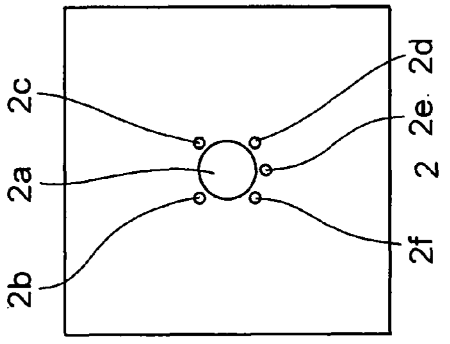

As shown in FIG. 5B, a through hole 2*a* is formed at the central part of the plate member 2, and through holes 2*b*-2*f* are also formed around the through hole 2*a*. As shown in FIG. 4, the plate member 2 is stacked on the aggregate pipe 1 to be joined to it. The through hole 2*a* communicates with the fuel introducing pipe 1*a*; a through hole 2*b* communicates with the air introducing pipe 1*b*; a through hole 2*c* communicates with the first offgas introducing pipe 1*c*; a through hole 2*d* communicates with the second offgas introducing pipe 1*d*; a through hole 2*e* communicates with the reformed gas exhausting pipe 1*e*; and a through hole 2*f* communicates with the exhaust pipe if.

Figure 5C:
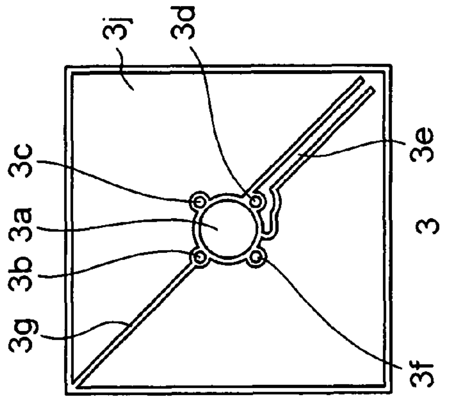

As shown in FIG. 5C, a divider piece 3*g* having the same height as that of the frame member 3 is formed inside the frame member 3. The divider piece 3*g* projects to the internal edge of the frame member 3, especially from one corner to the opposite corner thereof, inside the frame body 3. A through hole 3_a_ formed by the divider piece 3_g_ is formed at the central part of the space divided inside the frame member 3; through holes 3_b_-3_d_, a through hole 3_f_, and a slit 3_e_ are formed around the through hole 3_a_; and a chamber 3_j_, which is a space having the height of the frame member 3, is formed inside the frame body 3. One end of the slit 3_e_ is opened, and the slit 3_e_ communicates with the chamber 3_j_. The frame member 3 is stacked on the plate member 2 to be joined with it, and the bottom of the slit 3_e_ is covered by the plate member 2. The through hole 3_a_ communicates with the through hole 2_a_; the through hole 3_b_ communicates with the through hole 2_b_; the through hole 3_c_ communicates with the through hole 2_c_; the through hole 3_d_ communicates with the through hole 2_d_; and the through hole 3_f_ communicates with the through hole 2_f_. Moreover, the through hole 2_e_ communicates with the other end of the slit 3_e_.

Figure 5D:
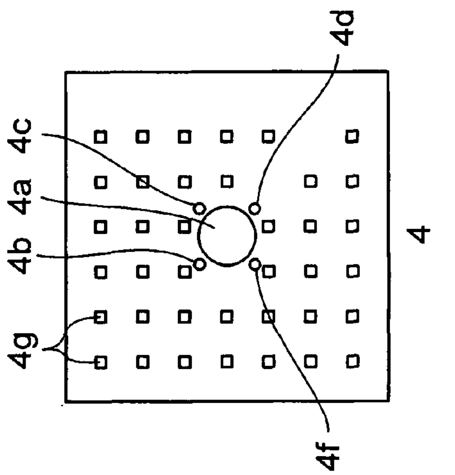

As shown in FIG. 5D, a through hole 4_a_ is formed at the central part of the plate member 4, and through holes 4_b_-4_d_ and a through hole 4_f_ are also formed around the through hole 4_a_. Moreover, the plate member 4 is formed in a honeycomb and is dotted with a plurality of holes 4_g_ penetrating the plate member 4. The plate member 4 is stacked on the frame member 3 to be joined with it, and the top of the slit 3_e_ is covered by the plate member 4. The through hole 4_a_ communicates with the through hole 3_a_; the through hole 4_b_ communicates with the through hole 3_b_; the through hole 4_c_ communicates with the through hole 3_c_; the through hole 4_d_ communicates with the through hole 3_d_; and the through hole 4_f_ communicates with the through hole 3_f_. The holes 4_g_ do not overlap with the slit 3_e_, and the top of the slit 3_e_ is covered by the plate member 4.

Figure 5E:
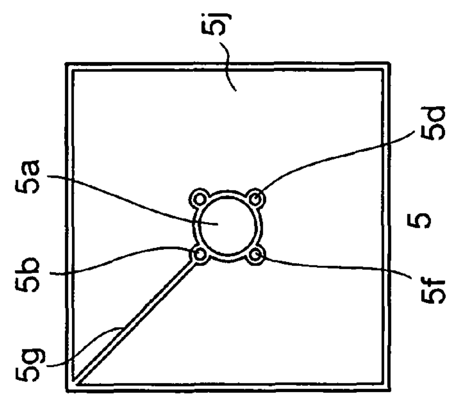

As shown in FIG. 5E, a divider piece 5_g_, which projects from a corner of the frame member 5 to the inside of the frame member 5 and has the same height as that of the frame member 5, is formed inside the frame member 5. A through hole 5_a_ formed by the divider piece 5_g_ is formed at the central part of the space divided inside the frame member 5; through holes 5_b_-5_d_ and a through hole 5_f_ are formed around the through hole 5_a_; and a chamber 5_j_, which is a space having the height of the frame member 5, is formed inside the frame member 5. The frame member 5 is stacked on the plate member 4 to be joined with it. The through hole 5_a_ communicates with the through hole 4_a_; the through hole 5_b_ communicates with the through hole 4_b_; the through hole 5_c_ communicates with the through hole 4_c_; the through hole 5_d_ communicates with the through hole 4_d_; and the through hole 5_f_ communicates with the through hole 4_f_.

Figure 5F:
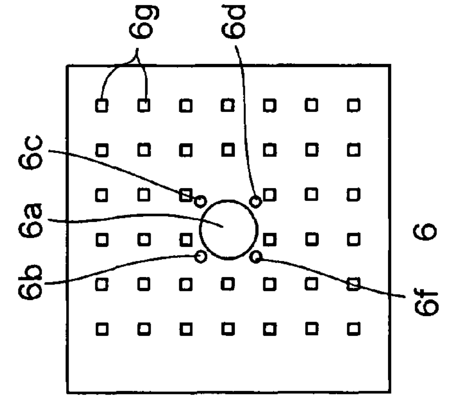
Figures 6A, 6B, 6C, 6D, 6E, 6F:
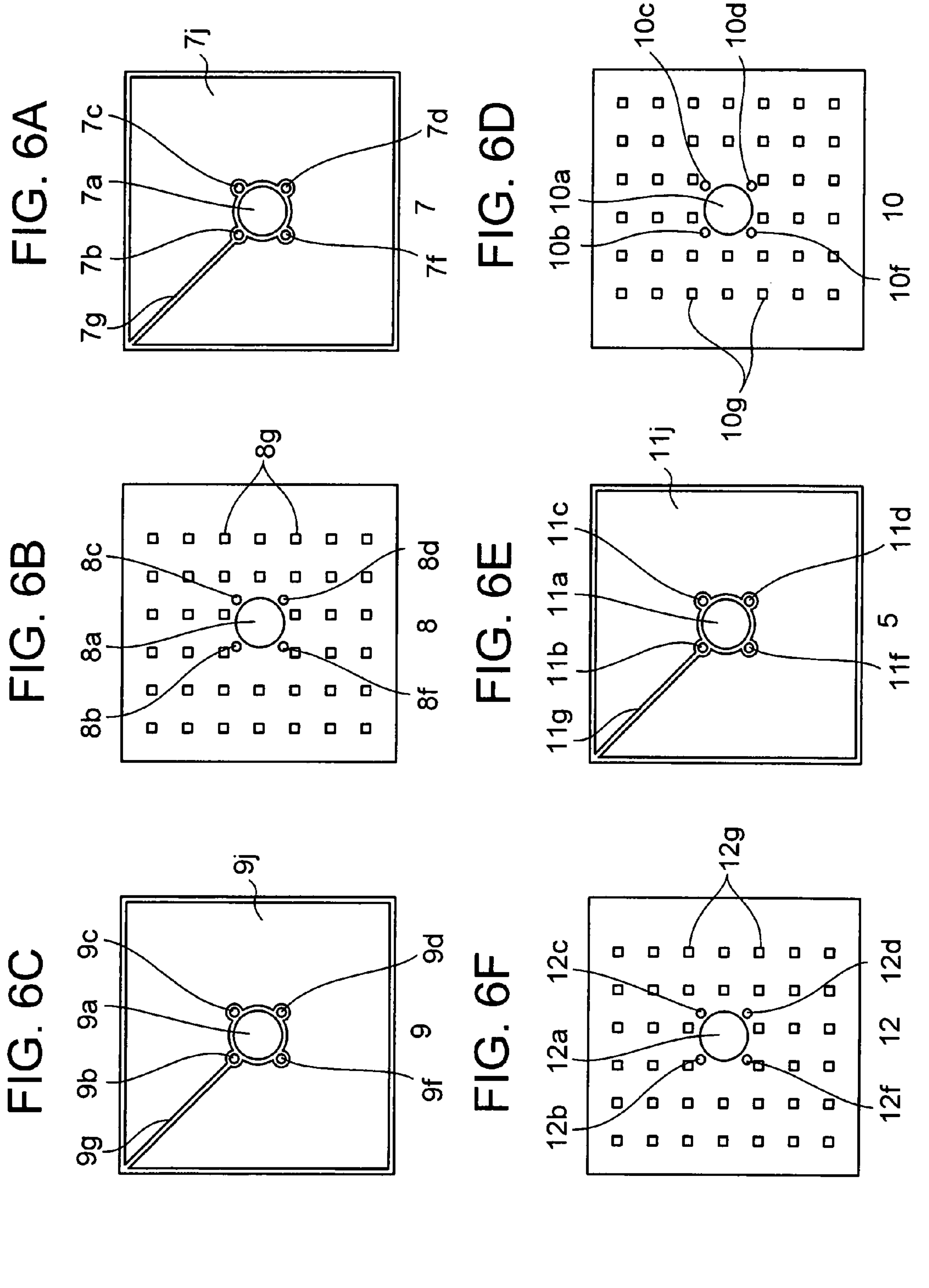

As shown in FIG. 5F, a through hole 6_a_ is formed at the central part of the plate member 6, and through holes 6_b_-6_d_ and a through hole 6_f_ are also formed around the through hole 6_a_. Moreover, the plate member 6 is formed in a honeycomb and is dotted with a plurality of holes 6_g_ penetrating the plate member 6. The plate member 6 is stacked on the frame member 5 to be joined with it. The through hole 6_a_ communicates with the through hole 5_a_; the through hole 6_b_ communicates with the through hole 5_b_; the through hole 6_c_ communicates with the through hole 5_c_; the through hole 6_d_ communicates with the through hole 5_d_; and the through hole 6_f_ communicates with the through hole 5_f_.

The frame members 7, 9, 11, and 13 shown in FIGS. 6A, 6C, 6E, and 7A, respectively, are formed similarly to the frame member 5. That is, chambers 7_j_, 9_j_, 11_j_, and 13_j_, which are spaces having the heights of the frame members 7, 9, 11, and 13, respectively, are divided in the frame members 7, 9, 11, and 13, respectively. Through holes 7_a_, 9_a_, 11_a_, and 13_a_, which severally have a shape and a size similar to those of the through hole 5_a_ and are formed by divider pieces 7_g_, 9_g_, 11_g_, and 13_g_, respectively, are formed to communicate with one another including the through hole 5_a_. Through holes 7_b_, 9_b_, 11_b_, and 13_b_, which severally have a shape and a size similar to those of the through hole 5_b_ and communicate with one another including the through hole 5_a_, are formed. Through holes 7_c_, 9_c_, 11_c_, and 13_c_, which severally have a shape and a size similar to those of the through hole 5_c_ and communicate with one another including the through hole 5_c_, are formed. Through holes 7_d_, 9_d_, 11_d_, and 13_d_, which severally have a shape and a size similar to those of the through hole 5_d_ and communicate with one another including the through hole 5_d_, are formed. Through holes 7_f_, 9_f_, 11_f_, and 13_f_, which severally have a shape and a size similar to those of the through hole 5_f_ and communicate with one another including the through hole 5_f_, are formed. Plate members 8, 10, and 12 shown in FIGS. 6B, 6D, and 6F, respectively, are formed similarly to the plate member 6. That is, through holes 8_a_, 10_a_, and 12_a_, which severally have a shape and a size similar to those of the through hole 6_a_ and communicate with one another including the through hole 6_a_, are formed in the plate members 8, 10, and 12. Through holes 8_b_, 10_b_, and 12_b_, which severally have a shape and a size similar to those of the through hole 6_b_ and communicate with one another including the through hole 6_b_, are also formed. Through holes 8_c_, 10_c_, and 12_c_, which severally have a shape and a size similar to those of the through hole 6_c_ and communicate with one another including the through hole 8_c_, are also formed. Through holes 8_d_, 10_d_, and 12_d_, which severally have a shape and a size similar to those of the through hole 6_d_ and communicate with one another including the through hole 6_d_, are also formed. Through holes 8_f_, 10_f_, and 12_f_, which severally have a shape and a size similar to those of the through hole 6_f_ and communicate with one another including the through hole 6_f_, are also formed. Through holes 8_g_, 10_g_, and 12_g_, which severally have a shape and a size similar to those of the through hole 6_g_ and communicate with one another including the through hole 6_g_ through chambers 7_j_, 9_j_, and 11_j_, respectively, are severally formed. These members 7-12 are stacked in the order to overlap with the frame member 5 and the plate member 6 to be joined together.

Figure 7A:
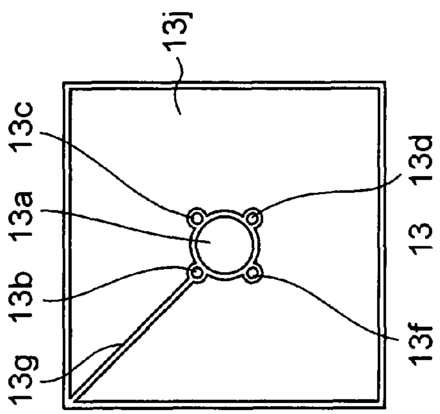
Figure 7B:
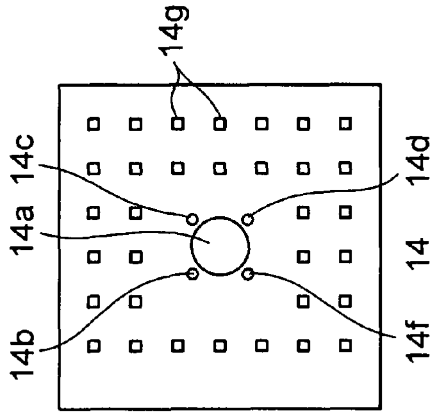

As shown in FIG. 7B, through holes 14_a_-14_d_ and a through hole 14_f_ are formed in the plate member 14. Moreover, the plate member 14 is formed in a honeycomb and is dotted with a plurality of holes 14_g_ penetrating the plate member 14. The plate member 14 is stacked on the frame member 13 to be joined with it. The through hole 14_a_ communicates with the through hole 13_a_; the through hole 14_b_ communicates with the through hole 13_b_; the through hole 14_c_ communicates with the through hole 13_c_; the through hole 14_d_ communicates with the through hole 13_d_; and the through hole 14_f_ communicates with the through hole 13_f_. Incidentally, the holes 14_g_ are not formed in a surface corresponding to a combustion chamber 15_f_, which will be described later, except the through hole 14_f_.

Figure 7C:
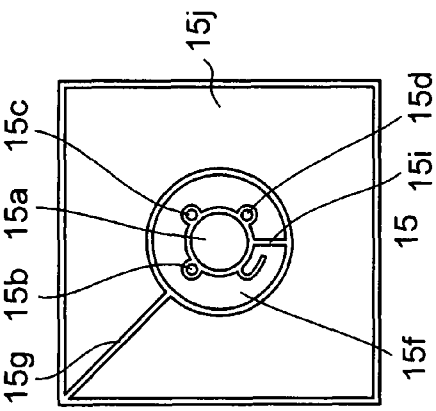

As shown in FIG. 7C, a divider piece 15_g_, which projects from a corner of the frame member 15 to the inside of the frame member 15 and has the same height as that of the frame member 15, is provided inside the frame member 15. A through hole 15_a_ formed by the divider piece 15_g_ is provided at the central part of the space divided inside the frame member 15, and through holes 15_b_-15_d_ are formed around the through hole 15_a_. The letter-C-like combustion chamber 15_f_ is formed to enclose the through hole 15_a_, and a chamber 15_j_ is formed inside the frame member 15. The frame member 15 is stacked on the plate member 14 to be joined with it, and the bottoms of the chamber 15_j_ and the combustion chamber 15_f_ are covered by the plate member 14. The through hole 15*a* communicates with the through hole 14*a*; the through hole 15*b* communicates with the through hole 14*b*; the through hole 15*c* communicates with the through hole 14*c*; and the through hole 15*d* communicates with the through hole 14*d*. Moreover, the through hole 14*f* communicates with the combustion chamber 15*f*. However, none of the holes 14*g* communicates with the combustion chamber 15*f*. The gateway of the combustion chamber 15*f* is partitioned with a partition 15*i*.

Figure 7D:
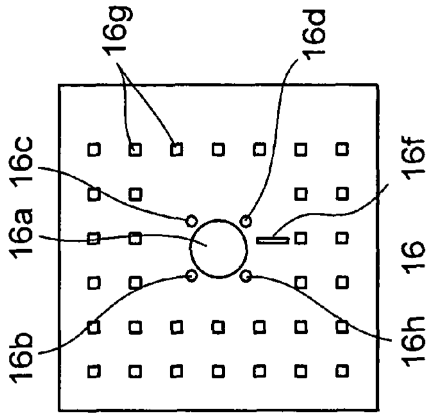

As shown in FIG. 7D, through holes 16*a*-16*d*, a slit 16*f*, and a through hole 16*h* are formed in the plate member 16. Moreover, the plate member 16 is formed in a honeycomb and is dotted with a plurality of holes 16*g* penetrating the plate member 16. The plate member 16 is stacked on the frame member 15 to be joined with it, and the tops of the chamber 15*j* and the combustion chamber 15*f* are covered by the plate member 16. The through hole 16*a* communicates with the through hole 15*a*; the through hole 16*b* communicates with the through hole 15*b*; the through hole 16*c* communicates with the through hole 15*c*; and the through hole 16*d* communicates with the through hole 15*d*. The slit 16*f* is situated on the right side of the partition 15*i* and a partition 17*i*, which will be described later. Incidentally, none of the holes 16*g* is formed on the surfaces corresponding to the combustion chamber 15*f* and a combustion chamber 17*f*, which will be described later, except for the slit 16*f*. The slit 16*f* communicates with the combustion chamber 15*f*, and the through hole 16*h* communicates with the combustion chamber 15*f*. None of the holes 16*g* communicates with the combustion chamber 15*f*.

Figure 7E:
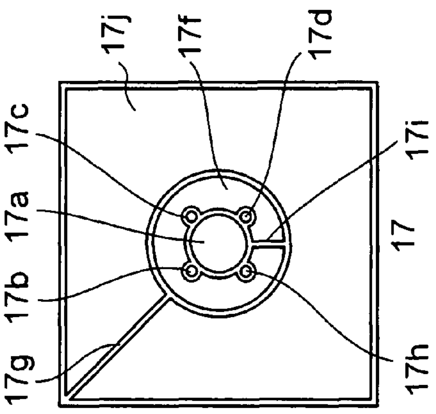

As shown in FIG. 7E, a divider piece 17*g*, which projects from a corner of the frame member 17 to the inside of the frame member 17 and has the same height as that of the frame member 17, is formed inside the frame member 17. A through hole 17*a* situated at the central part of the area formed by the divider piece 17*g* is formed at the central part of a space divided inside the frame member 17. Through holes 17*b*-17*d* and a through hole 17*h* are formed around the through hole 17*a*. The letter-C-like combustion chamber 17*f* is formed to enclose the through hole 17*a*. A chamber 17*j* is formed inside the frame member 17. The frame member 17 is stacked on the plate member 16 to be joined with it. The bottoms of the chamber 17*j* and the combustion chamber 17*f* are covered by the plate member 16. The through hole 17*a* communicates with the through hole 16*a*; the through hole 17*b* communicates with the through hole 16*b*; the through hole 17*c* communicates with the through hole 16*c*; the through hole 17*d* communicates with the through hole 16*d*; and the through hole 17*h* communicates with the through hole 16*h*. The gateway of the combustion chamber 17*f* is partitioned by the partition 17*i*. Moreover, the slit 16*f* communicates with the combustion chamber 17*f*, but none of the holes 16*g* communicates with the combustion chamber 17*f*.

Figure 7F:
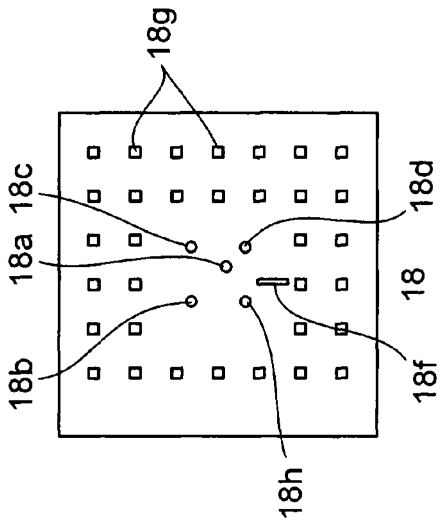

As shown in FIG. 7F, through holes 18*a*-18*d*, a slit 18*f* and a through hole 18*h* are formed in the plate member 18. The diameter of the through hole 18*a* is smaller than that of the through hole 17*a*. Moreover, the plate member 18 is formed in a honeycomb and is dotted with a plurality of holes 18*g* penetrating the plate member 18. The plate member 18 is stacked on the frame member 17 to be joined with it. The tops of the chamber 17*j* and the combustion chamber 17*f* are covered by the plate member 18. The through hole 18*a* communicates with the through hole 17*a*; the through hole 18*b* communicates with the through hole 17*b*; the through hole 18*c* communicates with the through hole 17*c*; the through hole 18*d* communicates with the through hole 17*d*; and the through hole 18*h* communicates with the through hole 18*h*. The slit 18*f* is situated on the left side of the partition 17*i* and a partition 19*i*, which will be described later. Incidentally, because none of the holes 18*g* is formed on the surfaces corresponding to the combustion chamber 17*f* and a combustion chamber 19*f*, which will be described later, except for the slit 18*f*, the slit 18*f* communicates with the combustion chamber 17*f*, and none of the holes 18*g* communicates with the combustion chamber 17*f*.

Figures 8A, 8B, 8C, 8D, 8E, 8F:
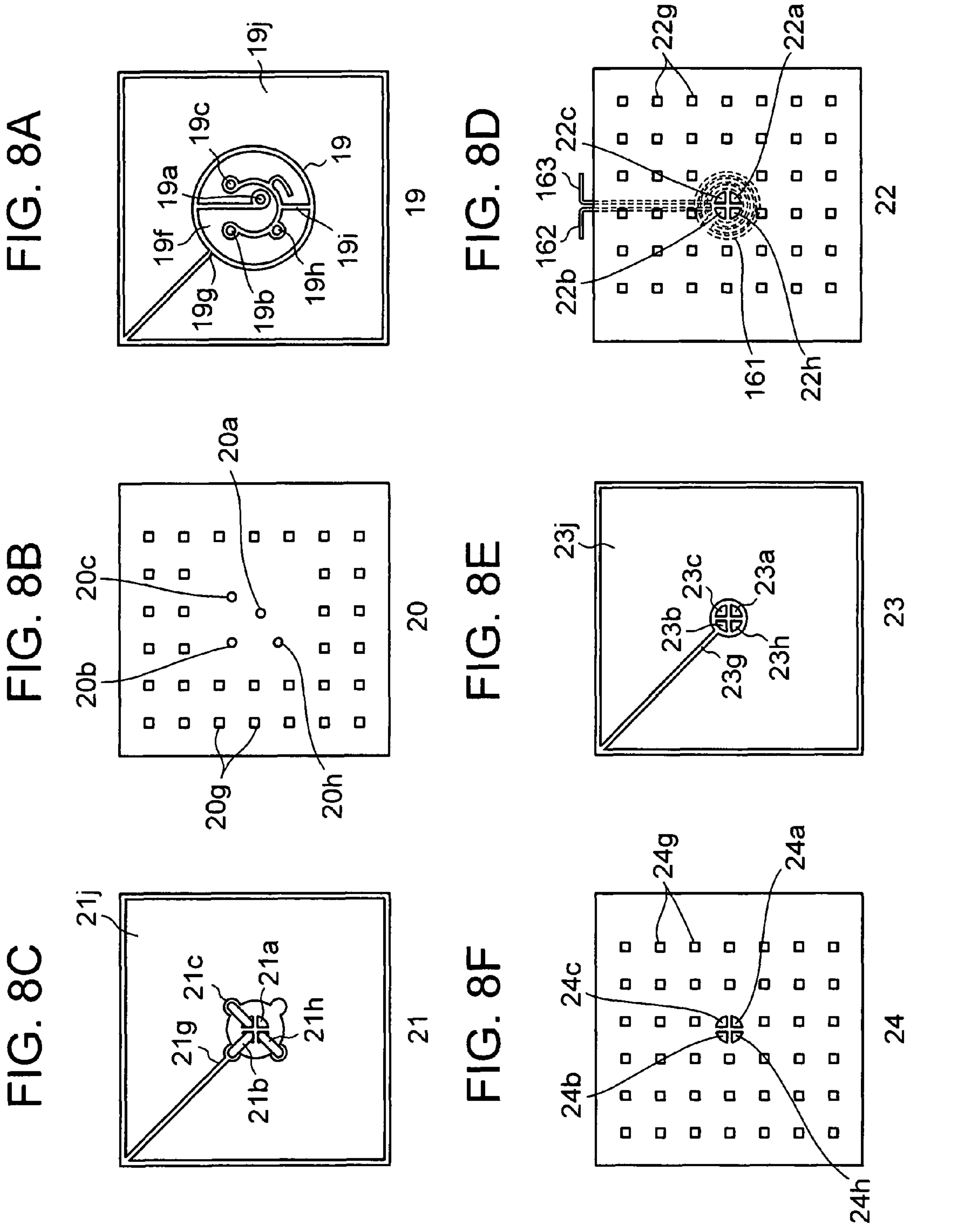

As shown in FIG. 8A, a divider piece 19*g*, which projects from a corner of the frame member 19 to the inside of the frame member 19 and has the same height as that of the frame member 19, is formed inside the frame member 19. A through hole 19*a* formed by the divider piece 19*g* is formed at the central part in the space divided inside the frame member 17. Through holes 19*b* and 19*c* and a through hole 19*h* are further formed around the through hole 19*a*. The combustion chamber 19*f* is formed to enclose the through hole 19*a*, and a chamber 19*j*, which is a space of the height of the frame member 19 is formed inside the frame member 19. The frame member 19 is stacked on the plate member 18 to be joined with it, and the bottoms of the chamber 19*j* and the combustion chamber 19*f* are covered by the plate member 18. The through hole 19*a* communicates with the through hole 18*a*; the through hole 19*b* communicates with the through hole 18*b*; the through hole 19*c* communicates with the through hole 18*c*; and the through hole 19*h* communicates with the through hole 18*h*. The gateway of the combustion chamber 19*f* is partitioned with the partition 19*i*. Moreover, although the through hole 18*d* and slit 18*f* communicate with the combustion chamber 19*f*, none of the holes 18*g* communicates with the combustion chamber 19*f*.

As shown in FIG. 8B, through holes 20*a*-20*c* and a through hole 20*h* are formed in the plate member 20. Moreover, the plate member 20 is formed in a honeycomb and is dotted with a plurality of holes 20*g* penetrating the plate member 20. The plate member 20 is stacked on the frame member 19 to be joined with it. The tops of the chamber 19*j* and the combustion chamber 19*f* are covered by the plate member 20. The through hole 20*a* communicates with the through hole 19*a*; the through hole 20*b* communicates with the through hole 19*b*; the through hole 20*c* communicates with the through hole 19*c*; and the through hole 20*h* communicates with the through hole 18*h*. Because none of the holes 20*g* is formed in the surface corresponding to the combustion chamber 19*f*, none of the holes 20*g* communicates with the combustion chamber 19*f*.

As shown in FIG. 8C, a divider piece 21*g*, which projects from a corner of the frame member 21 to the inside of the frame member 21 and has the same height as that of the frame member 21, is formed inside the frame member 21. A through hole 21*a* and slits 21*b*, 21*c*, and 21*h* are formed by the divider piece 21*g* in the space divided inside the frame member 21, and a chamber 21*j* is formed inside the frame member 21. The frame member 21 is stacked on the plate member 20 to be joined with it, and the bottoms of the slits 21*b*, 21*c*, and 21*h* are covered by the plate member 20. The bottom of the chamber 21*j* is also covered by the plate member 20. The through hole 21*a* communicates with the through hole 18*a*. Moreover, the through hole 20*b* communicates with an end of the slit 21*b*; the through hole 20*c* communicates with an end of the slit 21*c*; and the through hole 20*h* communicates with an end of a slit 21*h*. The divider piece 21*g* widely covers the circumference of the slits 21*b*, 21*c*, and 21*h* for efficiently propagating the heat of a heating wire 161, which will be described later, to the vaporizer 111 situated below.

As shown in FIG. 8D, through holes 22*a*-22*c* and a through hole 22*h* are formed at the central part of the plate member 22. Moreover, the plate member 22 is formed in a honeycomb and is dotted with a plurality of holes 22*g* penetrating the plate member 22. The plate member 22 is stacked on the frame member 19 to be joined with it. The tops of the slits 21*b*, 21*c*, and 21*h* are covered by the plate member 22, and the top of the chamber 21*j* is covered by the plate member 22. The through hole 22*a* communicates with the through hole 21*a*. The through hole 22*b* communicates with an end of the slit 21*b*; the through hole 22*c* communicates with an end of the slit 21*c*; and the through hole 22*h* communicates with an end of the slit 21*h*. Moreover, the heating wire 161 is formed around the through holes 22*a*-22*c* and the through hole 22*h* on the top surface (back surface) of the plate member 22.

As shown in FIG. 8E, a divider piece 23*g*, which projects from a corner of the frame member 23 to the inside of the frame member 23 and has the same height as that of the frame member 23, is formed inside the frame member 23. Through holes 23*a*-23*c* and a through hole 23*h* formed by the divider piece 23*g* is formed in the space divided inside the frame member 23, and a chamber 23*j* is formed inside the frame member 23. The frame member 23 is stacked on the plate member 22 to be joined with it, and the bottom of the chamber 23*j* is covered by the plate member 22. The through hole 23*a* communicates with the through hole 22*a*; the through hole 23*b* communicates with the through hole 22*b*; the through hole 23*c* communicates with the through hole 22*c*; and the through hole 23*h* communicates with the through hole 22*h*.

Figures 9A, 9B, 9C, 9D, 9E, 9F:
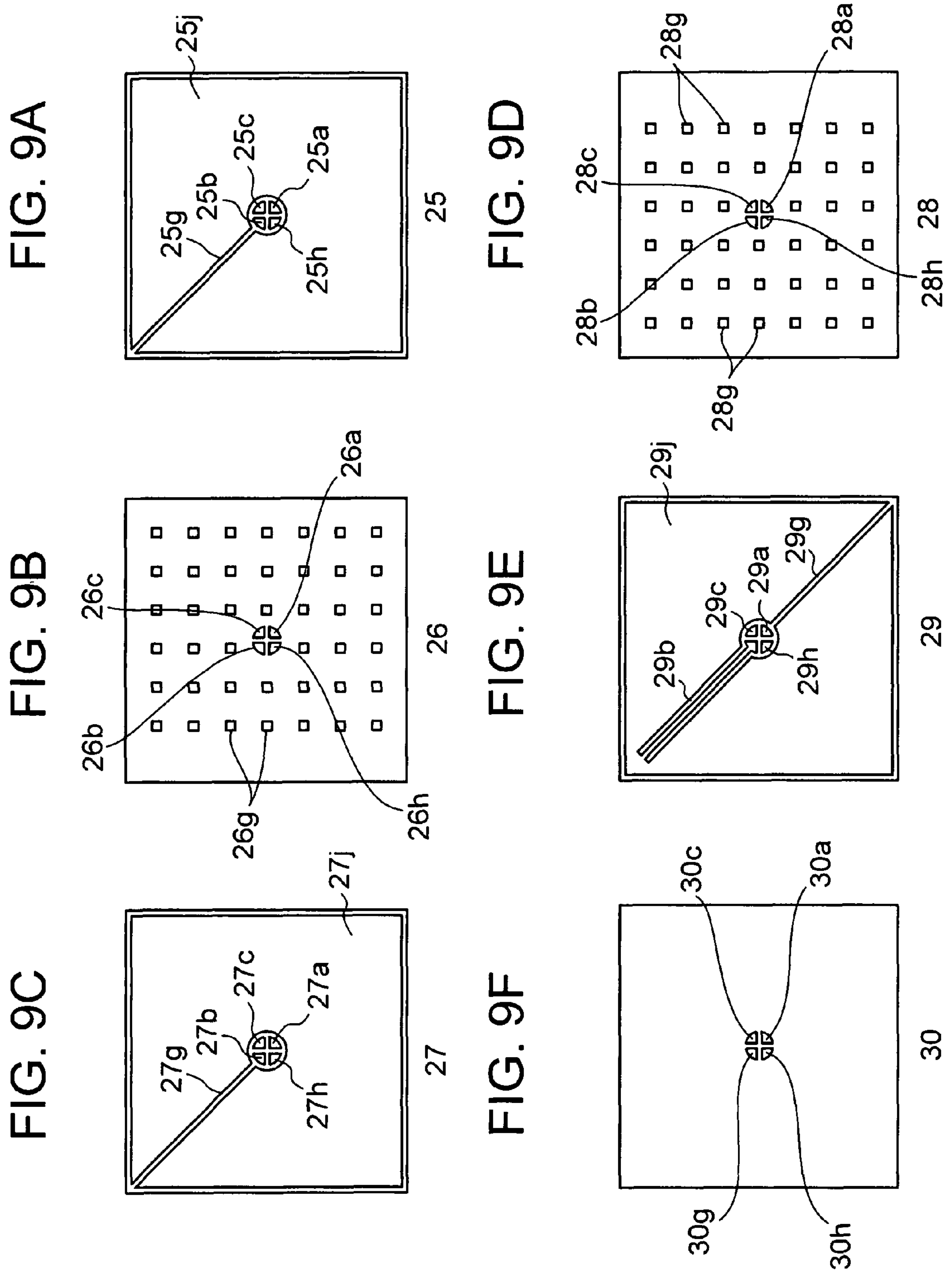

The plate members 24 and 26 shown in FIGS. 8F and 9B are formed similarly to the plate member 22. That is, through holes 24*a* and 26*a*, each of which has a shape and a size similar to those of the through hole 22*a* and communicates with one another including the through hole 22*a*, are formed in the plate members 24 and 26, respectively. Through holes 24*b* and 26*b*, each of which has a shape and a size similar to those of the through hole 22*b* and communicates with one another including the through hole 22*b*, are formed in the plate members 24 and 26, respectively. Through holes 24*c* and 26*c*, each of which has a shape and a size similar to those of the through hole 22*c* and communicates with one another including the through hole 22*c*, are formed in the plate members 24 and 26, respectively. Through holes 24*h* and 26*h*, each of which has a shape and a size similar to those of the through hole 22*h* and communicates with one another including the through hole 22*h*, are formed in the plate members 24 and 26, respectively. Through holes 24*g* and 26*g*, each of which has a shape and a size similar to those of the through hole 22*g* and communicates with one another including the through hole 22*g*, are formed in the plate members 24 and 26, respectively. The frame members 25 and 27 shown in FIGS. 9A and 9C, respectively, are formed similarly to the frame member 23. These members 24-27 are stacked on the frame member 22 and the plate member 24 to be overlapped on them in the order of the reference numerals, and are joined with one another. That is, through holes 25*a* and 27*a*, each of which has a shape and a size similar to those of the through hole 23*a* and communicates with one another including the through hole 23*a*, are formed in the frame members 25 and 27, respectively. Through holes 25*b* and 27*b*, each of which has a shape and a size similar to those of the through hole 23*b* and communicates with one another including the through hole 23*b*, are formed in the frame members 25 and 27, respectively. Through holes 25*c* and 27*c*, each of which has a shape and a size similar to those of the through hole 23*c* and communicates with one another including the through hole 23*c*, are formed in the frame members 25 and 27, respectively. Through holes 25*h* and 27*h*, each of which has a shape and a size similar to those of the through hole 23*h* and communicates with one another including the through hole 23*h*, are formed in the frame members 25 and 27, respectively.

As shown in FIG. 9D, through holes 28*a*-28*c* and a through hole 28*h* are formed at the central part of the plate member 28. Moreover, the plate member 28 is formed in a honeycomb and is dotted with a plurality of holes 28*g* penetrating the plate member 28. The plate member 28 is stacked on the frame member 27 to be joined with it. The top of a chamber 27*j* is covered by the plate member 28. A through hole 28*a* communicates with the through hole 27*a*; a through hole 28*b* communicates with the through hole 27*b*; a through hole 28*c* communicates with the through hole 27*c*; and the through hole 28*h* communicates with the through hole 27*h*. None of the holes 28*g* is formed on the surface corresponding to a slit 29*b*, which will be described later.

As shown in FIG. 9E, a divider piece 29*g*, which projects from a corner of the frame member 29 to the inside of the frame member 29 and has the same height as that of the frame member 29, is formed inside the frame member 29. Through holes 29*a*, 29*c*, and 29*h* and the slit 29*b*, which are formed by the divider piece 29*g*, are formed at the center of the space divided inside the frame member 29, and a chamber 29*j* is formed inside the frame member 29. One end of the slit 29*b* is opened to communicate with the chamber 29*j*. The frame member 29 is stacked on the plate member 28 to be joined with it, and the bottoms of the chamber 29*j* and the slit 29*b* are covered by the plate member 28. The through hole 29*a* communicates with the through hole 28*a*; the through hole 29*c* communicates with the through hole 28*c*; and the through hole 29*h* communicates with the through hole 28*h*. Moreover, the through hole 28*b* communicates with the other end of the slit 29*b*.

As shown in FIG. 9F, through holes 30*a*-30*c* and a through hole 30*h* are formed at the central part of the plate member 30. The plate member 30 is stacked on the frame member 29 to be joined with it. The tops of the chamber 29*j* and the slit 29*b* are covered by the plate member 30. The through hole 30*a* communicates with the through hole 29*a*; the through hole 30*c* communicates with the through hole 29*c*; and the through hole 30*h* communicates with the through hole 29*h*. Moreover, the through hole 29*b* communicates with the other end of the slit 29*b*.

Figures 10A, 10B, 10C, 10D, 10E, 10F:
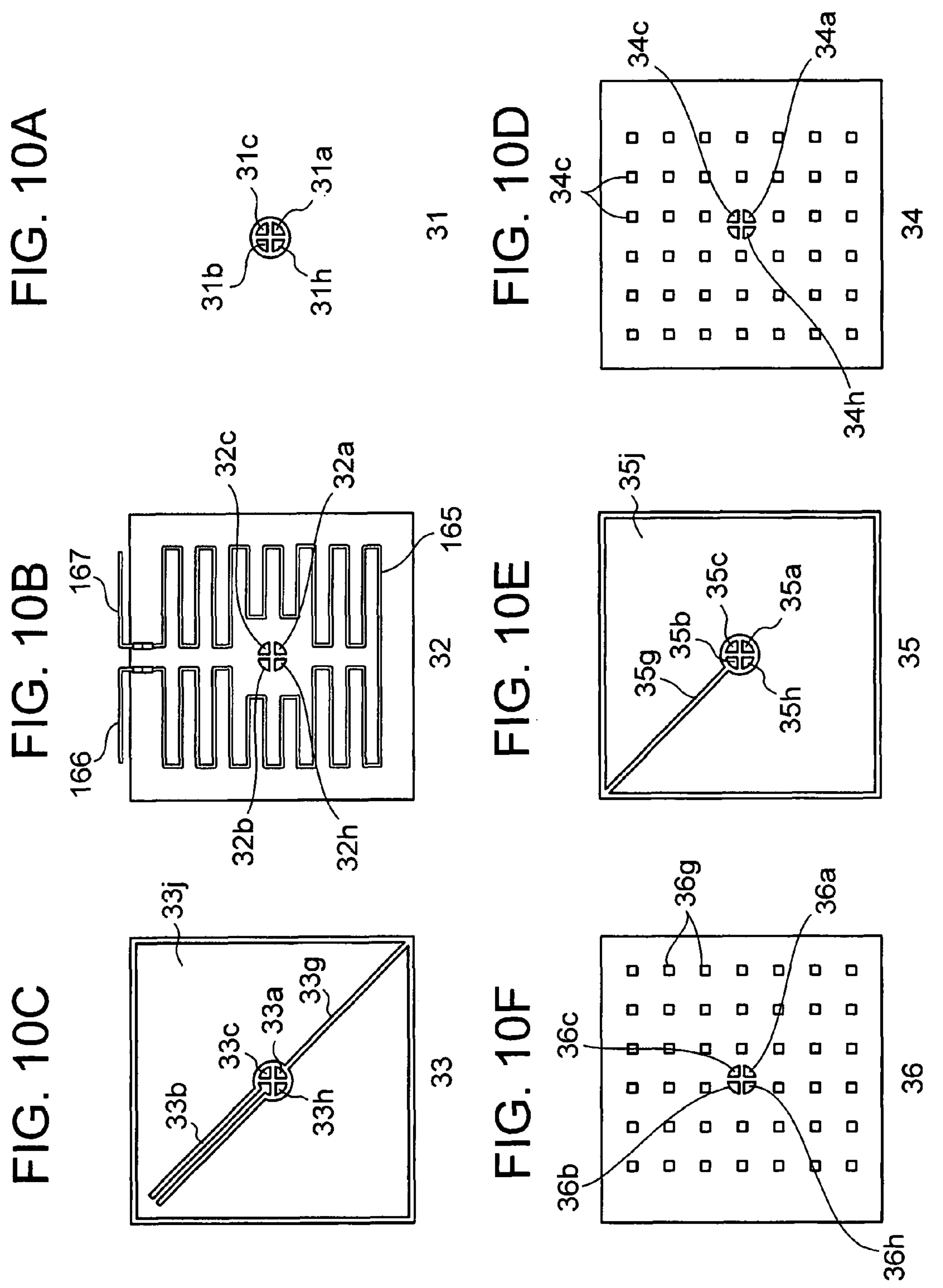

As shown in FIG. 10A, the member 31 is an aggregate pipe provided between the reformer 113 and the carbon monoxide remover 115, and through holes 31*a*-31*c* and a through hole 31*h* are formed therein. The plate member 32 shown in FIG. 10B is formed similarly to the plate member 30. A member 31 is put between the central part of the plate member 30 and the central part of the plate member 32, and the member 31 is joined with the plate member 30 and the plate member 32. Then, a through hole 32*a*, the through hole 31*a*, and the through hole 30*a* communicate with one another; a through hole 32*b*, a through hole 31*b*, and a through hole 30*b* communicate with one another; a through hole 32*c*, a through hole 31*c*, and the through hole 30*c* communicate with one another; and a through hole 32*h*, the through hole 31*h* and the through hole 30*h* communicate with one another. A heating wire 165 connected with lead wires 166 and 167 is provided around the through holes 31*a*-31*c* and the through hole 31*h* on the under surface of the plate member 32.

The frame member 33 shown in FIG. 10C is formed similarly to the frame member 29. The frame member 33 is stacked on the plate member 32 to be joined with it. The bottoms of a chamber 33*j* and a slit 33*b* are covered by the plate member 32. A through hole 33*a* formed by the divider piece 29*g* communicates with the through hole 32*a*; a through hole 33*c* communicates with the through hole 32*c*; and a through hole 33*h* communicates with a through hole 32*h*. Moreover, the through hole 32*b* communicates with an end of the slit 33*b*.

As shown in FIG. 10D, through holes 34*a*, 34*c*, and 34*h* are formed at the central part of the plate member 34. Moreover, the plate member 34 is formed in a honeycomb and is dotted with a plurality of holes 34*g* penetrating the plate member 34. The plate member 34 is stacked on the frame member 33 to be joined with it. The tops of the chamber 33*j* and the slit 33*b* are covered by the plate member 34. A through hole 34*a* communicates with the through hole 33*a*; a through hole 34*c* communicates with the through hole 33*c*; and a through hole 34*h* communicates with the through hole 33*h*.

The frame member 35 shown in FIG. 10E is formed similarly to the frame member 23. The frame member 35 is stacked on the plate member 34 to be joined with it, and the bottom of a chamber 35*j* is covered by the plate member 34. A through hole 35*a* formed by a divider piece 35*g* communicates with the through hole 34*a*; a through hole 35*c* communicates with the through hole 34*c*; and a through hole 35*h* communicates with the through hole 34*h*.

The plate member 36 shown in FIG. 10F is formed similarly to the plate member 26. The plate member 36 is stacked on the frame member 35 to be joined with it. The top of the chamber 35*j* is covered by the plate member 36. A through hole 36*a* communicates with the through hole 36*a*; a through hole 36*b* communicates with a through hole 35*b*; a through hole 36*c* communicates with the through hole 35*c*; and a through hole 36*h* communicates with the through hole 35*h*.

Figure 11A:
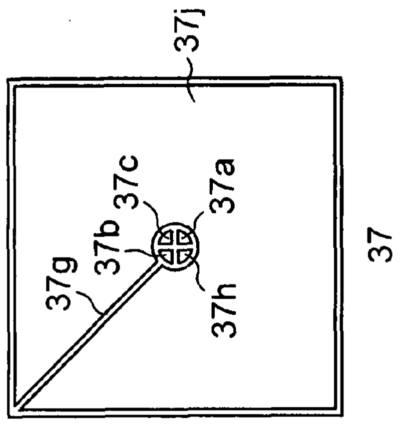

The frame member 37 shown in FIG. 11A is formed similar to the frame member 23. The frame member 37 is stacked on the plate member 36 to be joined with it. The bottom of a chamber 37*j* is covered by the plate member 36. A through hole 37*a* formed by a divider piece 37*g* communicates with the through hole 36*a*; a through hole 37*b* communicates with the through hole 36*b*; a through hole 37*c* communicates with the through hole 36*c*; and a through hole 37*h* communicates with the through hole 36*h*.

Figure 11B:
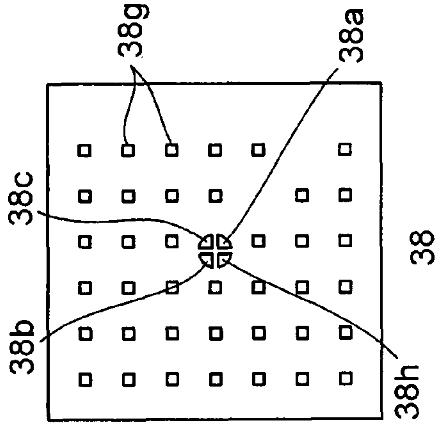

As shown in FIG. 11B, through holes 38*a*-38*c* and 38*h* are formed at the central part of the plate member 38. Moreover, the plate member 38 is formed in a honeycomb and is dotted with a plurality of holes 38*g* penetrating the plate member 38. The plate member 38 is stacked on the frame member 33 to be joined with it. The top of the chamber 37*j* is covered by the plate member 33. The through hole 34*a* communicates with the through hole 33*a*; the through hole 34*c* communicates with the through hole 33*c*; and the through hole 34*h* communicates with the through hole 33*h*.

Figure 11C:
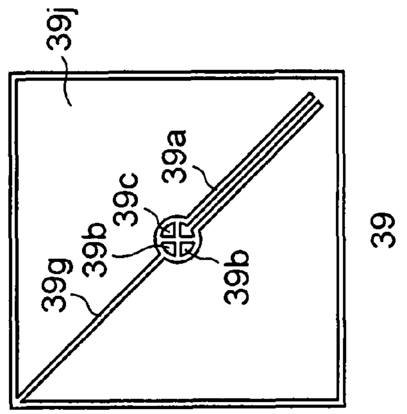

As shown in FIG. 11C, a divider piece 39*g*, which projects from a corner of the frame member 39 to the inside of the frame member 39 and has the same height as that of the frame member 39, is formed inside the frame member 39. Through holes 39*b*, 39*c*, and 39*h* and a slit 39*a* formed by the divider piece 39*g* are formed in the space divided inside the frame member 39, and a chamber 39*j* is formed inside the frame member 39. One end of the slit 39*a* is opened, and the chamber 39*j* and the slit 39*a* communicate with each other. The frame member 39 is stacked on the plate member 38 to be joined with it. The bottoms of the chamber 39*j* and the slit 39*a* are covered by the plate member 38. A through hole 39*b* communicates with a through hole 38*b*; a through hole 39*c* communicates with a through hole 38*c*; and a through hole 39*h* communicates with a through hole 38*h*. Moreover, a through hole 38*a* communicates with the other end of the slit 39*a*.

Figure 11D:
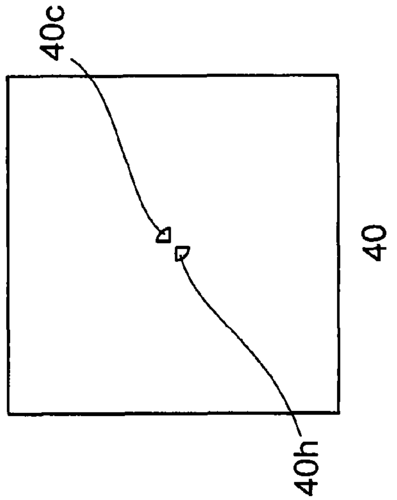

As shown in FIG. 11D, through holes 40*c* and 40*h* are formed at the central part of the plate member 40. The plate member 40 is stacked on the frame member 39 to be joined with it. The tops of the chamber 39*j* and the slit 39*a* are covered by the plate member 40. A through hole 40*c* communicates with the through hole 39*c*, and a through hole 40*h* communicates with the through hole 39*h*.

Figure 11E:
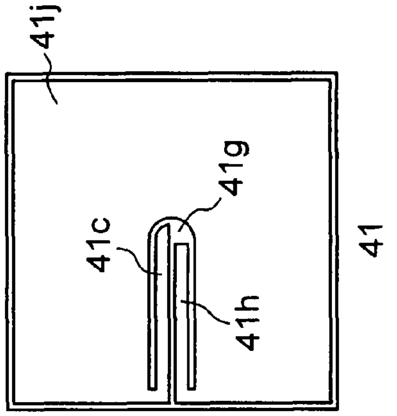

As shown in FIG. 11E, a divider piece 41*g*, which projects from the internal edge of the frame member 41 to the inside of the frame member 41 is formed inside the frame member 41. Slits 41*c* and 41*h* are formed on the divider piece 41*g*. One ends of the slits 41*c* and 41*h* are opened, and the slits 41*c* and 41*h* communicate with a chamber 41*j* inside the frame member 41. The frame member 41 is stacked on the plate member 40 to be joined with it. The bottoms of the chamber 41*j* and the slits 41*c* and 41*h* are covered by the plate member 40. The through hole 40*c* communicates with the other end of the slit 41*c*, and the through hole 40*h* communicates with the other end of the slit 40*h*.

Figure 11F:
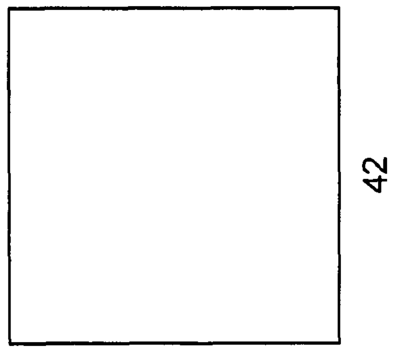

As shown in FIG. 11F, the plate member 42 is a flat plate. The plate member 42 is stacked on the frame member 41 to be joined it. The tops of the chamber 41*j* and the slits 41*c* and 41*h* are covered by the plate member 42.

Figure 12:
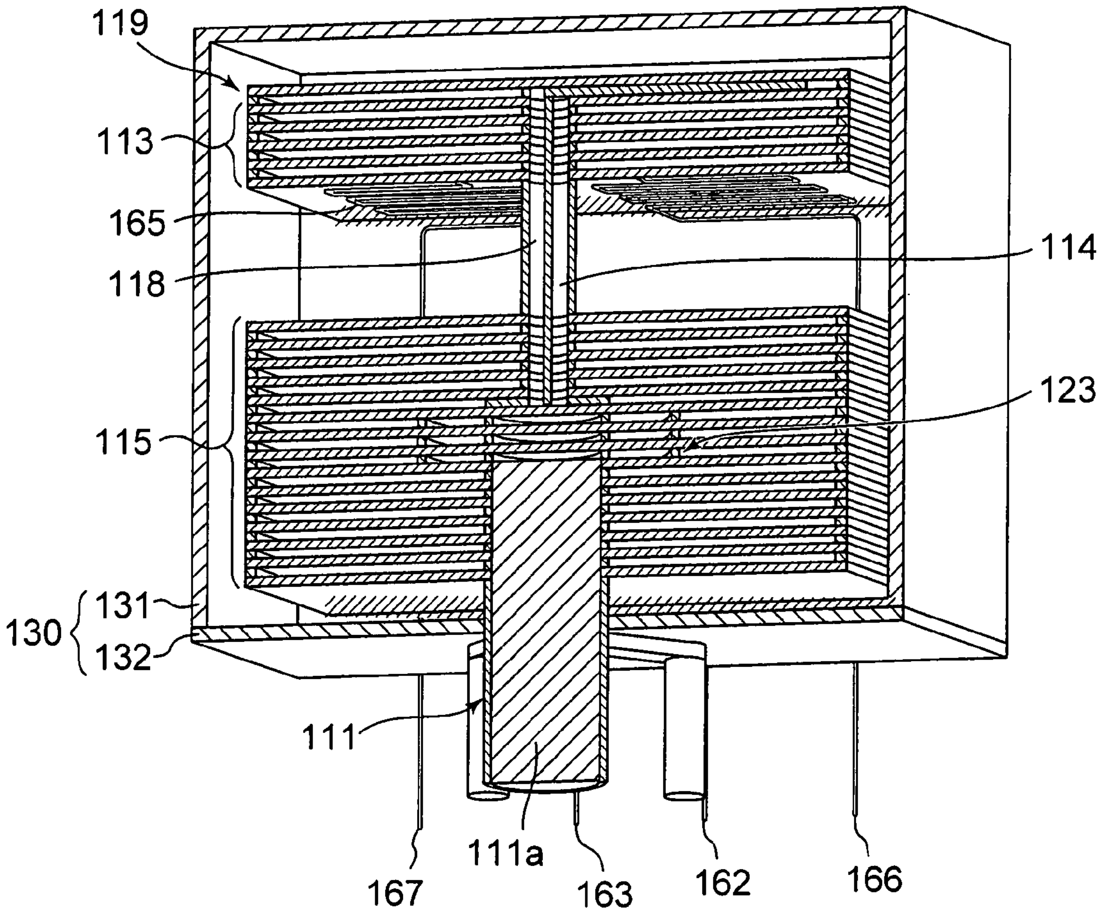
FIG. 12 is a perspective view showing the reaction device in the state of being fractured.
Figure 13B:
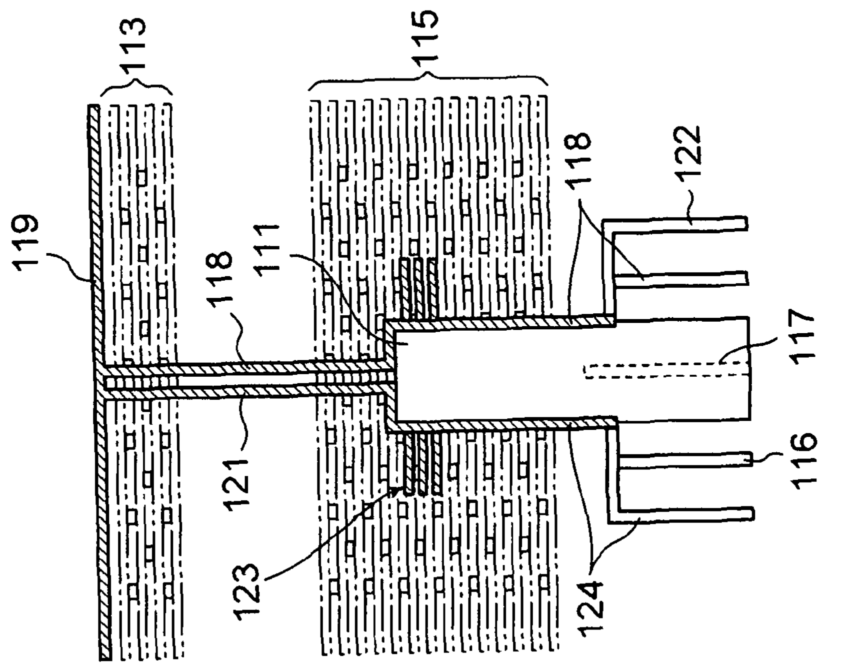
FIG. 13B is a schematic sectional view showing the main body of the reaction device principally.
Figure 13A:
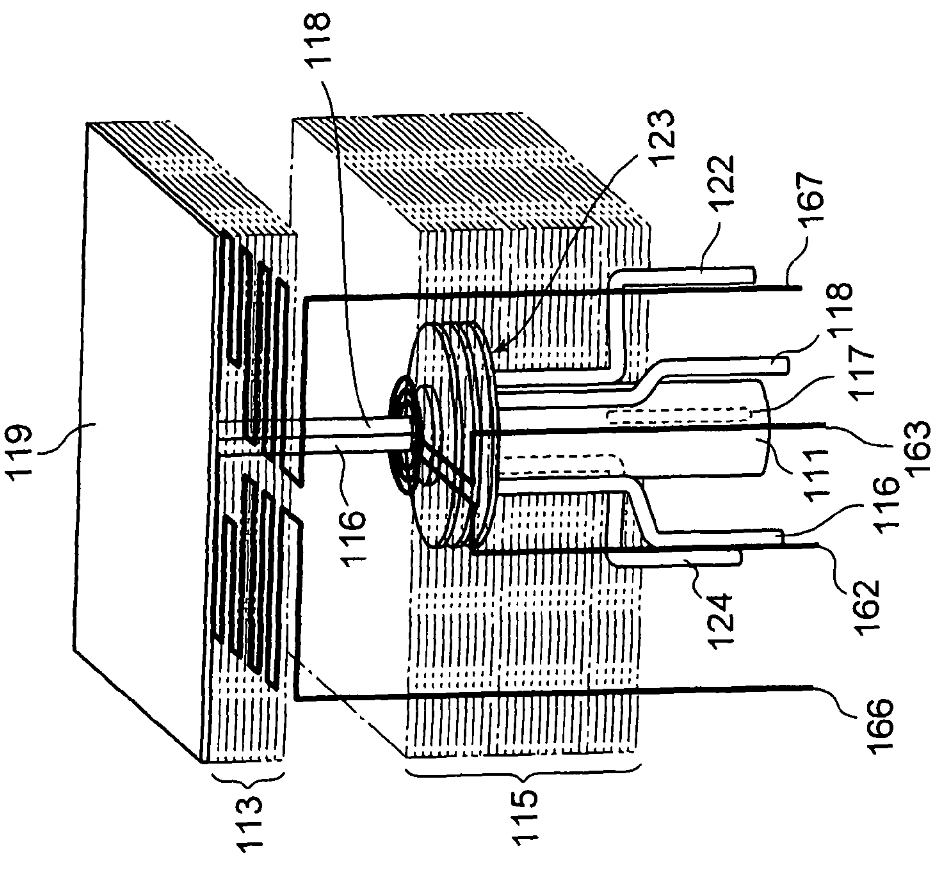
FIG. 13A is a schematic perspective view showing the main body of the reaction device principally.
Figure 14:
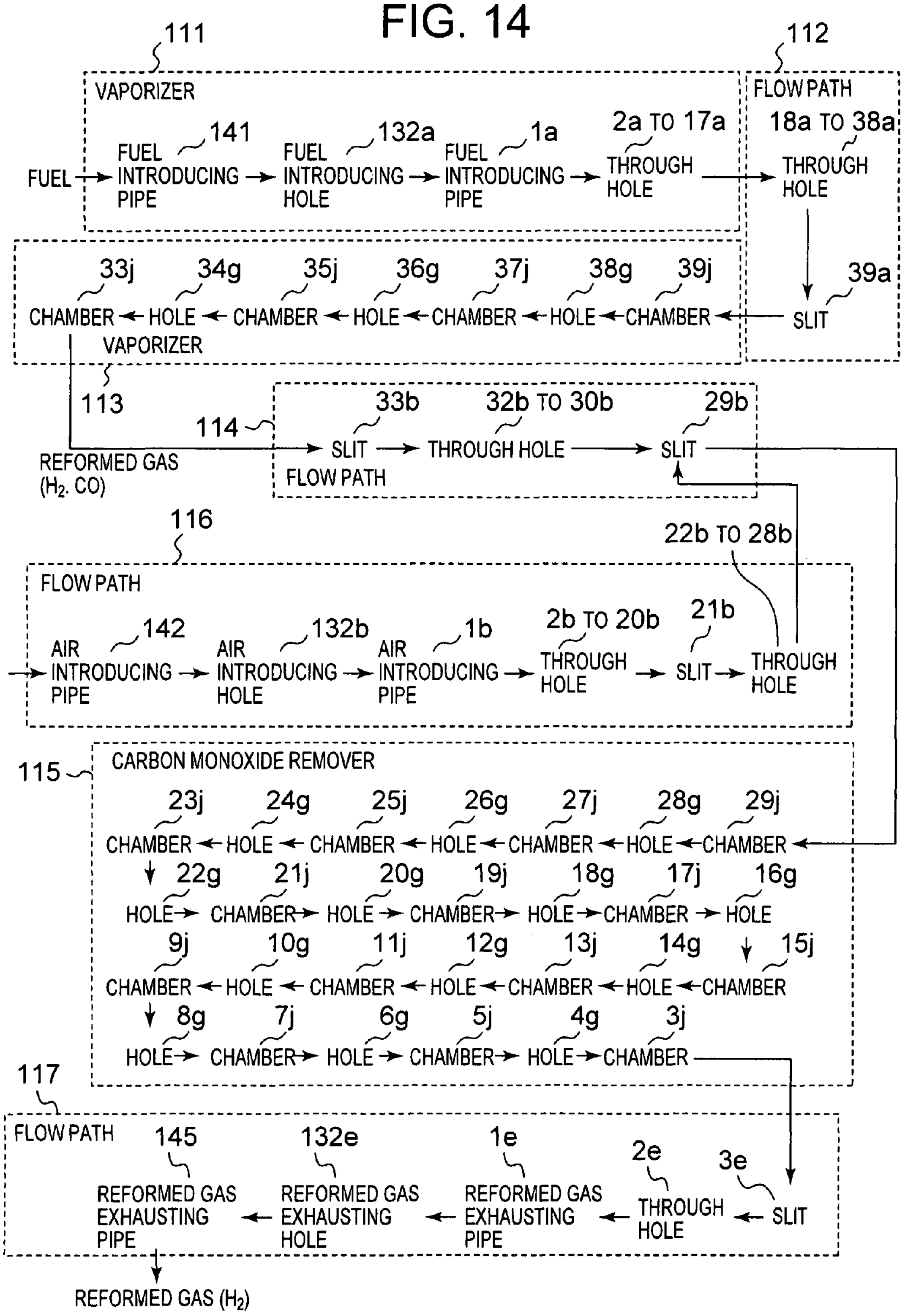
FIG. 14 is a diagram showing the routes inside the reaction device.
Figure 15:
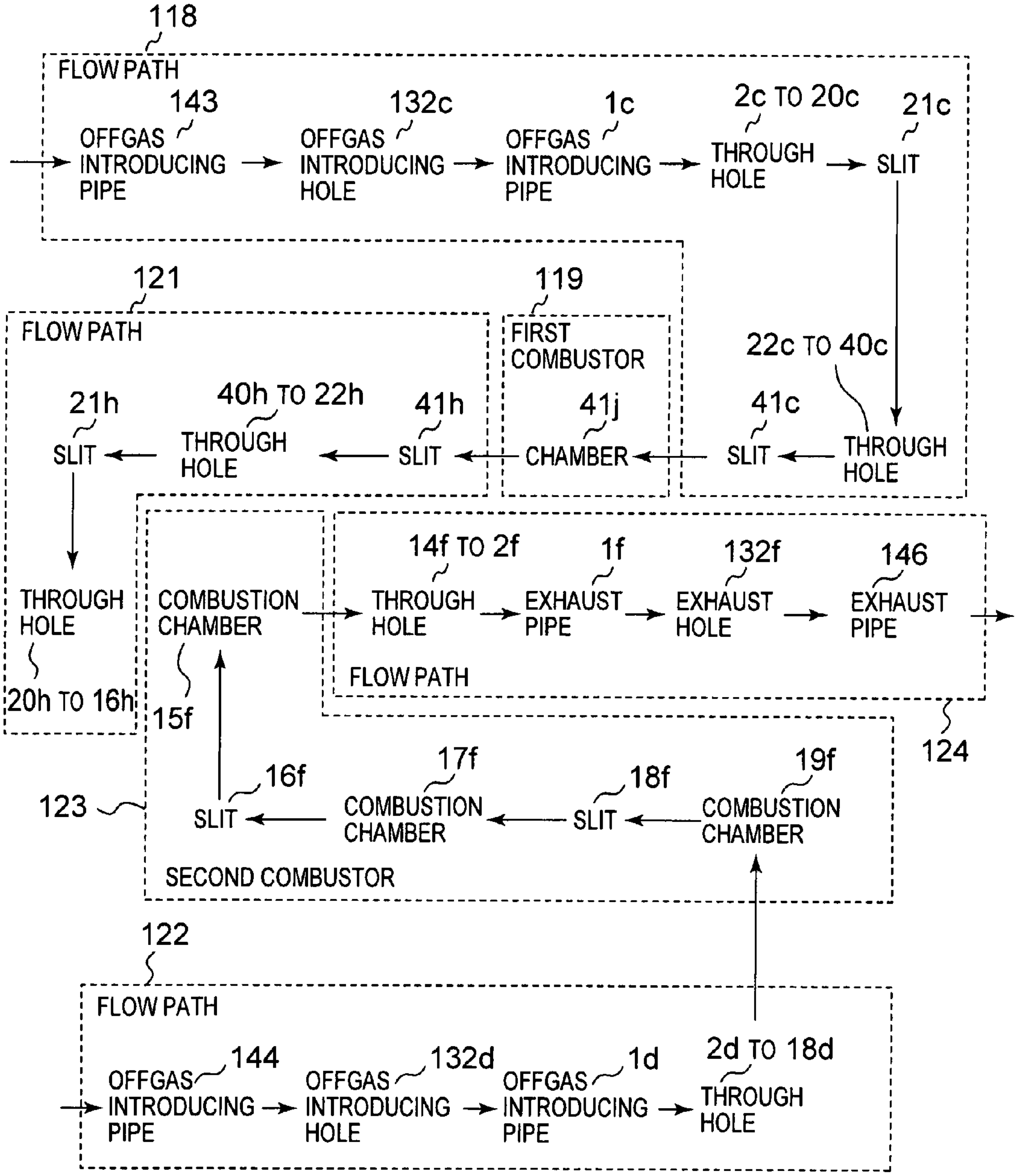
FIG. 15 is a diagram showing the routes inside the reaction device.

FIG. 12 is a perspective view of a longitudinal section of the reaction device 100; FIG. 13A is a perspective view principally showing the reaction device main body 150 and the manifold 140 of the reaction device 100; and FIG. 13B is a side view principally showing the reaction device main body 150 and the manifold 140. FIGS. 14 and 15 show correspondence relations between each section of the reaction device 100 shown in FIG. 1 and the routes formed by the stacking of the members 1-42 shown in FIGS. 5A-5F, 6A-6F, 7A-7F, 8A-8F, 9A-9F, 10A-10F, and 11A-11F. Incidentally, in FIGS. 13A and 13B, the reformer 113 and the carbon monoxide remover 115 are shown by alternate long and two short dashes lines in order to make it easy to see the vaporizer 111, the first combustor 119, the second combustor 123, and the like, which are formed inside the reaction device 100.

As shown in FIG. 14, the route in the range from the fuel introducing pipe 141 to the through hole 17*a* corresponds to the vaporizer 111. That is, as shown in FIGS. 12, 13A, and 13B, the members 1-17 are stacked; the member 1 (aggregate pipe 1) is joined on the top surface of the bottom plate 132 of the heat insulating package 130; and the manifold 140 is joined on the under surface of the bottom plate 132. Thereby, the fuel introducing pipe 141, the fuel introducing hole 132*a*, the fuel introducing pipe 1*a*, and the through hole 2*a*-17*a* are ranged to be a cylindrical tube, and the vaporizer 111 is hereby constructed. A liquid absorbing material 111*a* is filled up in this tube section, that is, in the rage from the fuel introducing pipe 141 to the through hole 16*a*. The upper end of the liquid absorbing material 111*a* is separated from the under surface of the plate member 18, and an internal space is formed between the upper end of the liquid absorbing material 111*a* and the under surface of the plate member 18 in the through hole 17*a*. Incidentally, the region in which the liquid absorbing material 111*a* is filled up is not especially limited. The region may be the one from the fuel introducing pipe 141 to the through hole 15*a*, the one from the fuel introducing pipe 141 to the through hole 14*a*, or the one from the fuel introducing pipe 141 to the through hole 13*a*.

The liquid absorbing material 111*a* is the one absorbing liquid. The liquid absorbing material 111*a* may be the one made by fixing inorganic fibers or organic fibers with a binder, the one made by sintering inorganic powder, the one made by fixing inorganic powder with a binder, or the one that is a mixture of graphite and glassy carbon. To put it concretely, a felt material, a ceramic porous material, a fiber material, and a carbon porous material are used as the liquid absorbing material 111*a*. The fuel and the water that have been sent from the fuel cartridge 101 are absorbed by the liquid absorbing material 111*a* from the lower end of the liquid absorbing material 111*a*, and permeate to the upper end of the liquid absorbing material 111*a* by the capillary phenomenon of the liquid absorbing material 111*a*. The mixed liquid of the fuel and the water that has been absorbed by the liquid absorbing material 111*a* vaporizes by heat in the neighborhood of the upper end inside liquid absorbing material 111*a*, and the mixture gas of the fuel and the water is emitted from the upper end of the liquid absorbing material 111*a*.

In order to heat the upper side of the vaporizer 111, the second combustor 123 is constructed around the top end of the vaporizer 111. As shown in FIG. 15, the range from the combustion chamber 19*f* to the combustion chamber 15*f* corresponds to the second combustor 123. That is, as shown in FIGS. 12, 13A, and 13B, the members 14-20 are stacked, and the upper and lower sides of the combustion chambers 15*f*, 17*f*, and 19*f* are covered. The combustion chamber 15*f* and the combustion chamber 17*f* communicate with each other with the slit 16*f*, and the combustion chamber 17*f* and the combustion chamber 19*f* communicate with each other with the slit 18*f*. Thereby, the second combustor 123 is constructed. Moreover, a combusting catalyst (for example, platinum) is carried at the parts facing the combustion chambers 15*f*, 17*f*, and 19*f* (for example, the central part of the under surface of the plate member 20, the central parts of both the surfaces of the plate members 18 and 16, and the central part of the top surface of the plate member 14). The gaseous fuel (hydrogen and the like) supplied to the second combustor 123 is combusted (oxidized) by the combusting catalyst, and combustion heat is thereby generated. The operating temperature of the vaporizer 111 is made to be the one within a range of 130-150° C. by the combustion heat of the second combustor 123.

If the liquid absorbing material 111*a* is filled up from the fuel introducing pipe 141 to the through hole 16*a* or the through hole 15*a*, then the upper end of the liquid absorbing material 111*a* is situated inside the second combustor 123. Moreover, if the liquid absorbing material 111*a* is filled up from the fuel introducing pipe 141 to the through hole 14*a*, through hole 13*a*, or a lower part than the through hole 13*a*, then the upper end of the liquid absorbing material 111*a* is situated on the lower outside of the second combustor 123.

The heating wire 161 (shown in FIG. 8D) is subsidiarily provided besides the second combustor 123. The heating wire 161 is the one made by patterning an electric heating material (electric resistance material), such as gold, and is formed at the central part of the top surface of the plate member 22. Lead wires 162 and 163 are connected to both the ends of the heating wire 161, respectively. As shown in FIGS. 2, 3, and the like, the lead wires 162 and 163 penetrate the bottom plate 132 to be extended to the outside of the heat insulating package 130. Incidentally, because the electric resistance of the heating wire 161 depends on temperature, the heating wire 161 also functions as a temperature sensor to measure the temperature on the basis of the electric current and the voltage thereof. The second combustor 123 and the heating wire 161 are used for heating the vaporizer 111 and the carbon monoxide remover 115 to a predetermined temperature.

As shown in FIG. 15, the range from the offgas introducing pipe 144 to the through hole 18*d* corresponds to the flow path 122, and a mixture gas of a gaseous fuel and air is sent to the second combustor 123 with the flow path 122. The range from the through hole 14*f* to the exhaust pipe 146 corresponds to the flow path 124, and exhaust gasses such as carbon dioxide and water vapor are sent with the flow path 124 to be ejected to the outside. That is, as shown in FIGS. 12, 13A, and 13B, the stacking of the members 1-18, the joining of the bottom plate 132 with the aggregate pipe 1, and the joining of the bottom plate 132 with the manifold 140 range the offgas introducing pipe 144, the offgas introducing hole 132*d*, the offgas introducing pipe 1*d*, and the through hole 2*d*-18*d*. The flow path 122 is hereby constructed, and the flow path 122 communicates with the combustion chamber 19*f* through a through hole 19*d*. Similarly, the ranging of the exhaust pipe 146, the exhaust hole 132*f*, the exhaust pipe if, and the through hole 2*f*-14*f* constructs the flow path 124, and the flow path 124 communicates with the combustion chamber 15*f* through the through hole 14*f*.

As shown in FIG. 14, the range from the through hole 18*a* to the slit 39*a* corresponds to the flow path 112. That is, as shown in FIGS. 12, 13A, and 13B, the members 18-40 are stacked, and the through holes 18*a*-38*a* and the slit 39*a* are ranged to construct the tubular flow path 112. The flow path 112 communicates with the vaporizer 111 through the through hole 18*a*. The mixture gas of water and fuel that has vaporized in the vaporizer 111 is sent to the reformer 113 through the flow path 112.

As shown in FIG. 14, the range from the chamber 39*j* to the chamber 33*j* corresponds to the reformer 113. That is, as shown in FIGS. 12, 13A, and 13B, the member 32-40 are stacked; the upper and lower sides of the chambers 33*j*, 35*j*, 37*j*, and 39*j* are covered; the chambers 33*j* and 35*j* communicates with each other through the holes 34*g*; the chambers 35*j* and 37*j* communicate with each other through the holes 36*g*; the chambers 37*j* and 39*j* communicates with each other through the holes 38*g*; and the reformer 113 is hereby constructed. A reforming catalyst (such as a Pd/ZnO catalyst in the case where the fuel is methanol) is carried on the parts facing the chambers 33*j*, 35*j*, 37*j*, and 39*j* (for example, the under surface of the plate member 40, both the surfaces of the plate members 38, 36, and 34, and the top surface of the plate member 32). The mixture gas of the fuel and the water sent from the vaporizer 111 receives a reforming reaction by the reforming catalyst in the reformer 113, and hydrogen and the like are generated.

Because heat is necessary for the reforming reaction, the first combustor 119 heating the reformer 113 is provided on the reformer 113, and the heating wire 165 is subsidiarily provided at the bottom part of the reformer 113. The heating wire 165 is made by patterning an electric heating material (electric resistance material), such as gold, in a meandering shape, and is formed on the under surface of the plate member 32. The lead wires 166 and 167 are connected to both the ends of the heating wire 165, respectively. The lead wires 166 and 167 penetrate the bottom plate 132 to extend to the outside of the heat insulating package 130. Incidentally, because the electric resistance of the heating wire 165 depends on temperature, the heating wire 165 also functions as a temperature sensor for measuring temperature on the basis of the electric current and the voltage thereof.

As shown in FIG. 15, the chamber 41*j* corresponds to the first combustor 119. That is, as shown in FIGS. 12, 13A, and 13B, the stacking of the members 40-42 covers the upper and lower sides of the chamber 41*j* to construct the first combustor 119. A combusting catalyst (such as platinum) is carried on the parts facing the chamber 41*j* (the top surface of the plate member 40, and the under surface of the plate member 42). The gaseous fuel (of hydrogen and the like) supplied to the first combustor 119 is combusted by the combusting catalyst, and combustion heat is hereby generated. The operating temperature of the reformer 113 is made to be the one within the range of 360-380° C. by the combustion heat of the first combustor 119 and the heating of the heating wire 165.

As shown in FIG. 15, the range from the offgas introducing pipe 143 to the slit 41*c* corresponds to the flow path 118, and the mixture gas of the gaseous fuel and the air which gas is the remainder of the hydrogen that has been supplied from the flow path 117 to the fuel cell type generator cell 102 and has not been subjected to the electrochemical reaction in the fuel cell type generator cell 102 is sent to the first combustor 119 through the flow path 118. Moreover, the chamber 41*j* corresponds to the first combustor 119. The range from the slit 41*h* to the through hole 16*h* corresponds to the flow path 121. The exhaust gases of water, carbon dioxide, and the like, are sent to the flow path 124 through the flow path 121, and are ejected to the outside from the flow path 124. That is, as shown in FIGS. 12, 13A, and 13B, the stacking of the members 1-42, the joining of the bottom plate 132 with the aggregate pipe 1, and the joining of the bottom plate 132 with the manifold 140 range the offgas introducing pipe 143, the offgas introducing hole 132*c*, the offgas introducing pipe 1*c*, the through holes 2*c*-20*c*, the slit 21*c*, the through holes 22*c*-40*c*, and the slit 41*c*. The flow path 118 is hereby constructed, and the flow path 118 communicates with the chamber 41*j* at an end of the slit 41*c*. Similarly, the ranging of the through holes 16*h*-20*h*, the slit 21*h*, the through holes 22*h*-40*h*, and the slit 41*h* constructs the flow path 121. The flow path 121 communicates with the chamber 41*j* at an end of the slit 41*h*.

As shown in FIG. 14, the range from the slit 33*b* to the slit 29*b* corresponds to a flow path 114. That is, as shown in FIGS. 12, 13A, and 13B, the members 28-34 are stacked, and through holes 30*b*-32*b* are ranged. Furthermore, the slit 29*b* is ranged with the through hole 30*b*; the slit 33*b* is ranged with the through hole 32*b*; and the flow path 114 is constructed. The flow path 114 communicates with the reformer 113 at an end of the slit 33*b*, and communicates with the carbon monoxide remover 115 at an end of the slit 29*b*. The hydrogen, the carbon monoxide, and the like, which have been generated at the reformer 113, are sent to the carbon monoxide remover 115 through the flow path 114.

As shown in FIG. 14, the range from the air introducing pipe 142 to the through hole 28*b* corresponds to the flow path 116, and the range from the chamber 29*j* to the chamber 3*j* corresponds to the carbon monoxide remover 115. That is, as shown in FIGS. 12, 13A, and 13B, the members 1-30 are stacked, and the upper and lower sides of the chambers 3*j*-29*j* are covered. These chambers 3*j*-29*j* communicate with each other through the hole of the plate member between each of them, and the carbon monoxide remover 115 is hereby constructed. Moreover, the stacking of the members 1-30, the joining of the bottom plate 132 with the aggregate pipe 1, and the joining of the bottom plate 132 with the manifold 140 range the air introducing pipe 142, the air introducing hole 132*b*, the air introducing pipe 1*b*, the through holes 2*b*-20*b*, the slit 21*b*, and the through holes 22*b*-28*b*. The flow path 116 is hereby constructed. The flow path 116 communicates with the chamber 29*j* through the slit 29*b*, and air is sent to the carbon monoxide remover 115 through the flow path 116. A selectively oxidizing catalyst (such as platinum) is carried on the parts facing the chambers 3*j*-29*j* (for example, the under surface of the plate member 30, both the surfaces of the plate members 28, 26, 24, 22, 20, 18, 16, 14, 12, 10, 8, 6, and 4, and the top surface of the plate member 2). The hydrogen, the carbon monoxide, and the like, sent from the reformer 113 are mixed with the air sent through the flow path 116, and flow in the carbon monoxide remover 115. In the carbon monoxide remover 115, the carbon monoxide is preferentially oxidized by the selectively oxidizing catalyst, and the carbon monoxide is hereby removed.

As shown in FIG. 14, the range from the slit 3*e* to the reformed gas exhausting pipe 145 corresponds to the flow path 117, and a reformed gas such as the hydrogen and the like is sent from the carbon monoxide remover 115 to the outside through the flow path 117. That is, as shown in FIGS. 12, 13A, and 13B, the stacking of the members 1-3, the joining of the bottom plate 132 with the aggregate pipe 1, the joining of the bottom plate 132 with the manifold 140 range the reformed gas exhausting pipe 145, the reformed gas exhausting hole 132*e*, the reformed gas exhausting pipe 1*e*, the through hole 2*e*, and the slit 3*e*. The flow path 117 is hereby constructed, and the flow path 117 communicates with the chamber 3*j* at an end of the slit 3*e*.

As described above, the stacking of the members 1-30 constructs the carbon monoxide remover 115, the vaporizer 111, and the second combustor 123. As shown in FIG. 12, the vaporizer 111 is provided by being inserted from the lower part of the carbon monoxide remover 115 into the inside of the carbon monoxide remover 115; the second combustor 123 is provided around the top end of the vaporizer 111 inside the carbon monoxide remover 115; and the heating wire 161 is provided on the second combustor 123 inside the carbon monoxide remover 115. Such an arrangement relation improves the balance among the heat generated by the second combustor 123, the heat generated by the carbon monoxide remover 115, and the heat to be used for the vaporization in the vaporizer 111. Consequently, the carbon monoxide remover 115 and the vaporizer 111 can be operated in a suitable temperature range (130-150° C.), and the efficiency of using heat is also improved. Incidentally, the tubular flow path 112 for ejecting the mixture gas vaporized in the vaporizer 111 to send the mixture gas from the vaporizer 111 to the reformer 113 is provided to be inserted from the upper part of the carbon monoxide remover 115 into the inside of the carbon monoxide remover 115 adversely to the vaporizer 111, and the flow path 112 communicates with the vaporizer 111 inside the carbon monoxide remover 115.

In particular, the heat generated in the carbon monoxide remover 115 easily fills the inside of the carbon monoxide remover 115, and the temperature inside the carbon monoxide remover 115 easily rises. However, because the vaporizer 111 is provided to be inserted to the inside of the carbon monoxide remover 115, the temperature inside the carbon monoxide remover 115 does not become a too high temperature.

Moreover, the temperature of the carbon monoxide remover 115 tends to be distributed in such a way that the temperature in the inside thereof is higher and that in outer side thereof is lower. The temperature of the vaporizer 111 also tends to be distributed in such a way that the temperature at the top end thereof is higher and that in the bottom end is lower. Consequently, the mixed liquid of the fuel and the water that has been absorbed by the liquid absorbing material 111*a* is vaporized in the inside and the surface on the top end side of the liquid absorbing material 111*a*, and the vaporizing of the mixed liquid is scarcely caused in the inside and the surface of the bottom end thereof. Consequently, the gas vaporized in the liquid absorbing material 111*a* does not flow backward to be discharged from the lower end of the liquid absorbing material 111*a* to the lower part. Consequently, the permeation quantity of the mixed liquid into the liquid absorbing material 111*a* is stabilized, and the quantity of the gasses transpired from the upper end side of the liquid absorbing material 111*a* can also be stabilized in its turn to make it possible to reduce the changes of the flow rate by bumping.

Moreover, the operating temperature of the upper part laminated body (members 32-42) including the reformer 113 and the first combustor 119 and the operating temperature of the lower part laminated body (members 1-30) including the carbon monoxide remover 115, the vaporizer 111, and the second combustor 123 differ from each other. The operating temperature of the upper part laminated body is within a range of 360-380° C., and the operating temperature of the lower part laminated body is within the range of 130-150° C. A space is here formed between the upper part laminated body at a higher temperature and the lower part laminated body at a lower temperature, and the member 31 in the shape of the aggregate pipe, which is thinner than each of the upper part laminated body and the lower part laminated body, connects the upper part laminated body with the lower part laminated body. Consequently, because the heat conduction route from the upper part laminated body to the lower part laminated body is limited to the member 31, a temperature difference can be generated between the upper part laminated body and the lower part laminated body.

Incidentally, the present invention is not limited to the embodiment described above, but various improvements and the changes of the design thereof may be performed within a range of not-departing from the sprit and the scope of the present invention.

Figure 16:
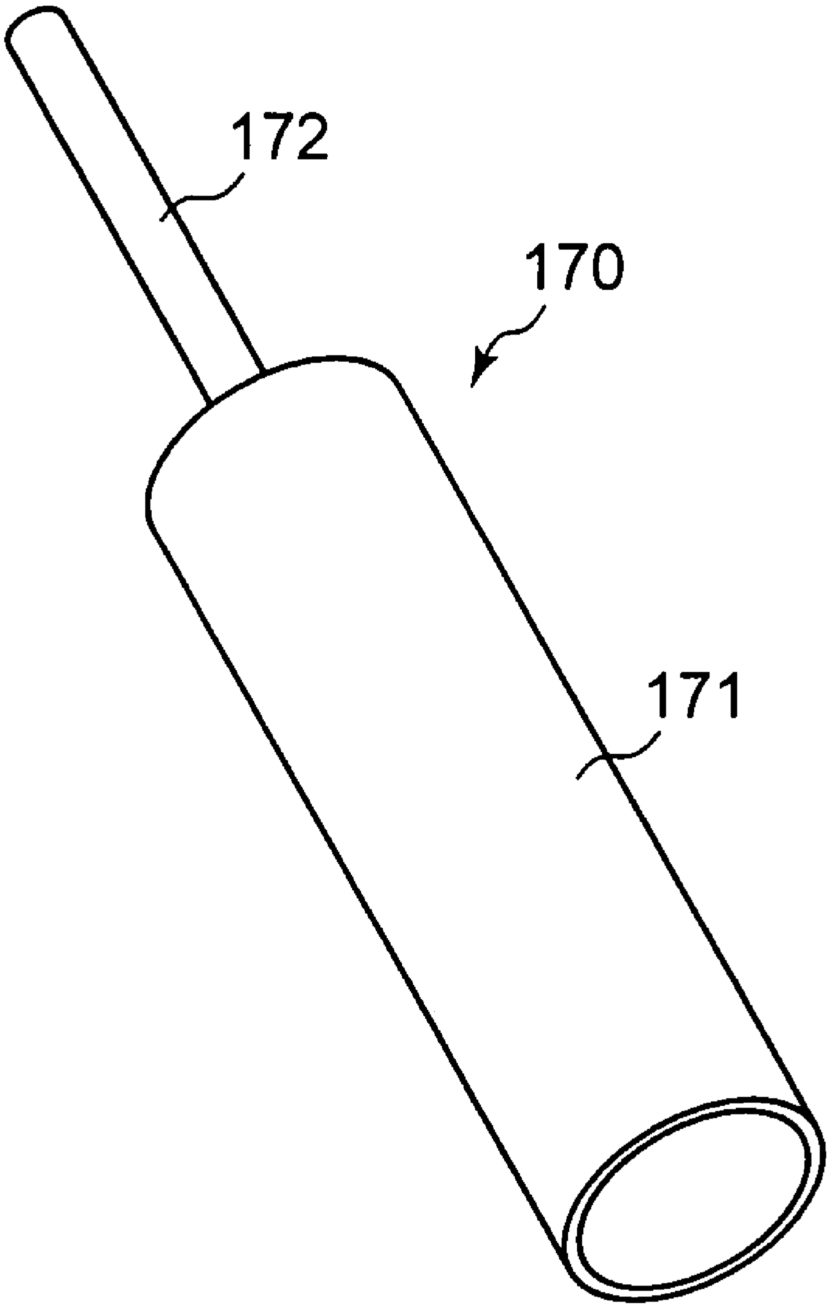
FIG. 16 is a perspective view showing a two-stage pipe of a reaction device of a modification.

In the embodiment described above, the through holes 2*a*-17*a* are ranged by stacking the members 2-31 to form the vaporizer 111, and the through holes 18*a*-31*a* are ranged to form the flow path 112. Instead, it is possible to make a two-stage pipe 170 as shown in FIG. 16 penetrate the lower part laminated body of the members 2-30 from the lower part thereof to the upper part thereof without providing the things enclosing the through holes 2*a*-31*a* in the members 2-31. In this case, a part 171 having a larger diameter in the two-stage pipe 170 corresponds to the through holes 2*a*-17*a*, and a part 172 having a smaller diameter in the two-stage pipe 170 corresponds to the through holes 18*a*-38*a*. The top end of the two-stage pipe 170 is joined with the under surface of the plate member 31, and the hollow in the part 172 having the smaller diameter communicates with the through hole 32*a* of the plate member 32. Furthermore, a selectively oxidizing catalyst is carried on the periphery of the two-stage pipe 170, and consequently the selectively oxidizing catalyst faces the chambers 3*j*-29*j*. Moreover, the selectively oxidizing catalyst joins the contact surface of the periphery of the two-stage pipe 170 and the members 2-31.

Second Embodiment

Figure 17:
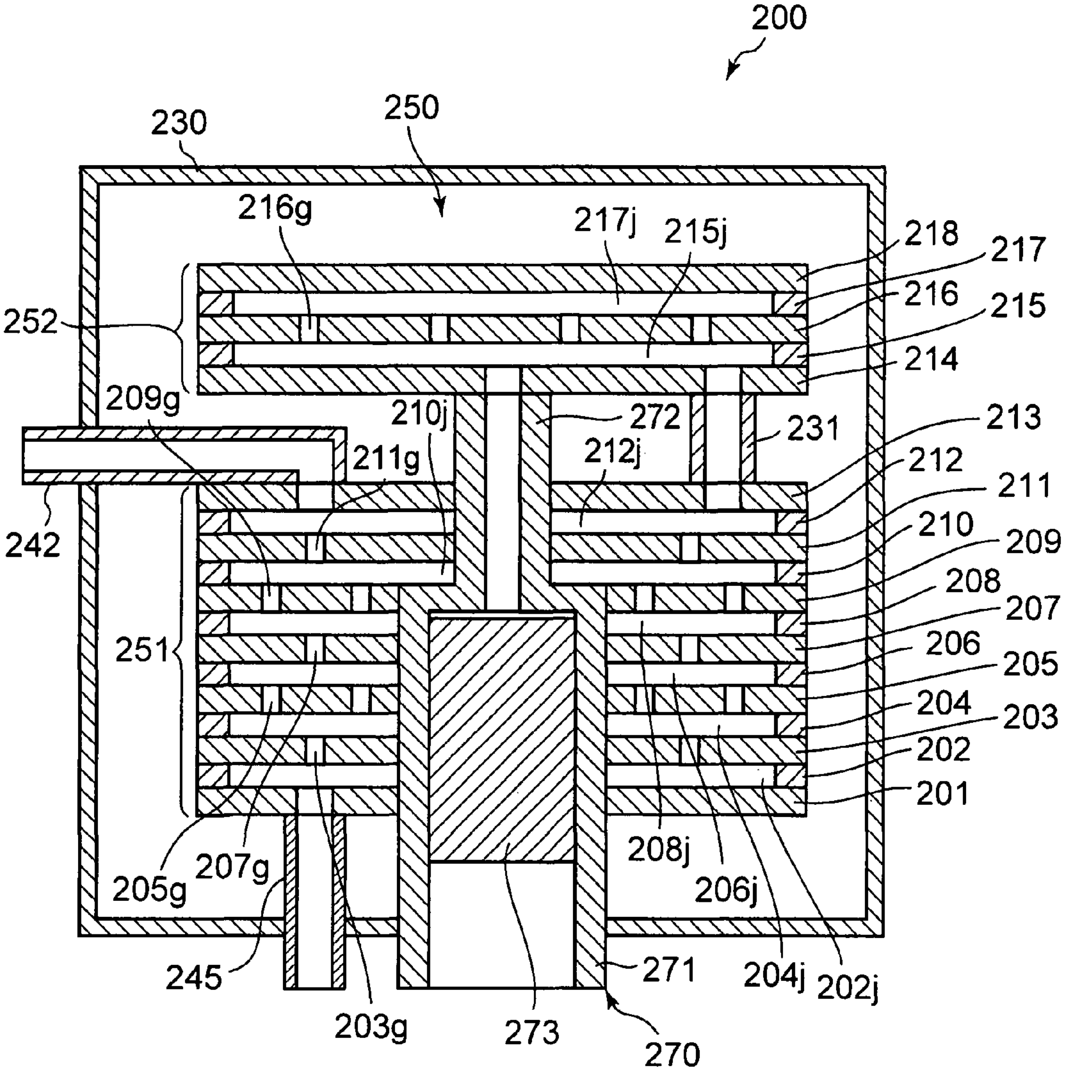
FIG. 17 is a longitudinal sectional view of a reaction device of a second embodiment to which the present invention is applied.

FIG. 17 is a longitudinal sectional view of a reaction device 200 of a second embodiment.

Also the reaction device 200 has a small size similarly to the reaction device 100 of the first embodiment, and is mounted on an electronic device together with a fuel cell type generator cell and a fuel cartridge.

The reaction device 200 includes a heat insulating package 230 having an inside hollow, and a reaction device main body 250 housed in the heat insulating package 230. The heat insulating package 230 is made of a metal material, such as stainless steel (for example, SUS 316L), and a metallic reflection film of aluminum, gold, silver, or copper is formed on the inner surface of the heat insulating package 230. The inside of the heat insulating package 230 is made to be in a vacuum state.

The reaction device main body 250 includes a lower part laminated body 251, an upper part laminated body 252, a vaporizer pipe 270 penetrating the lower part laminated body 251 from the lower part thereof to the upper part thereof.

The vaporizer pipe 270 is formed to be two stages. That is, the vaporizer pipe 270 includes a large diameter cylindrical tube section 271 at the lower part and a small diameter cylindrical tube section 272, which has a diameter smaller than that of the large diameter cylindrical tube section 271 and is connected to the upper end of the large diameter cylindrical tube section 271. The vaporizer pipe 270 is the one forming the large diameter cylindrical tube section 271 and the small diameter cylindrical tube section 272 to be one body. A heating wire is patterned on the periphery of the top end of the large diameter cylindrical tube section 271, or a combustor is provided at the circumference of the top end of the large diameter cylindrical tube section 271 inside the lower part laminated body 251. The upper part of the large diameter cylindrical tube section 271 is heated by the heating wire and the combustor.

A liquid absorbing material 273 is filled up in the large diameter cylindrical tube section 271 of the vaporizer pipe 270, and the upper end of the liquid absorbing material 273 is separated from the lower end of the small diameter cylindrical tube section 272. An internal space is formed at the hollow upper part of the large diameter cylindrical tube section 271. The liquid absorbing material 273 absorbs liquid. The liquid absorbing material 273 may be the one made by fixing inorganic fibers or organic fibers with a binder, the one made by sintering inorganic powder, the one made by fixing inorganic powder with a binder, or the one of a mixture of graphite and glassy carbon. The liquid absorbing material 273 is filled up into the large diameter cylindrical tube section 271 of the vaporizer pipe 270 in this way, and a vaporizer is configured from the large diameter cylindrical tube section 271, a liquid supplying material 273, and the like.

The lower part laminated body 251 is one made by putting each of frame members 202, 204, 206, 208, 210, and 212 between each of a plurality of plate members 201, 203, 205, 207, 209, 211, and 213, respectively, and by joining them. By the stacking of the plate members and the frame members 201-213, the upper and lower sides of the frame members 202, 204, 206, 208, 210, and 212 are covered, and chambers 202*j*, 204*j*, 206*j*, 208*j*, 210*j*, and 212*j* are formed inside the frame members 202, 204, 206, 208, 210, 212, respectively.

Moreover, each of the plate members 203, 205, 207, 209, and 211 is formed in a honeycomb, and a plurality of holes 203*g*, 205*g*, 207*g*, 209*g*, and 211*g* is formed in the plate members 203, 205, 207, 209, and 211, respectively.

A selectively oxidizing catalyst (for example, platinum) is carried on both the surfaces of each of the plate members 203, 205, 207, 209, and 211; the selectively oxidizing catalyst is carried on the top surface of the plate member 201; and the selectively oxidizing catalyst is carried on the under surface of the plate member 213. The selectively oxidizing catalyst is carried on the periphery of the vaporizer pipe 270. By the carrying of the selectively oxidizing catalyst in such a way, the lower part laminated body 251 functions as a carbon monoxide remover.

Through holes are formed at the central parts of the plate members 201, 203, 205, 207, and 209, and the large diameter cylindrical tube section 271 of the vaporizer pipe 270 is inserted into the through holes. Moreover, through holes are also formed at the central parts of the plate members 211 and 213, and the small diameter cylindrical tube section 272 of the vaporizer pipe 270 is inserted into the through holes, too. By the penetration of the vaporizer pipe 270 into the lower part laminated body 251 from the lower part thereof, the vaporizer made of the large diameter cylindrical tube section 271 and the like is provided to be inserted into the inside of the lower part laminated body 251 (carbon monoxide remover), and a combustor and a heater are provided around the top end of the vaporizer inside the lower part laminated body 251.

The large diameter cylindrical tube section 271 of the vaporizer pipe 270 penetrates the heat insulating package 230 to extend to the outside of the heat insulating package 230. A reformed gas exhausting pipe 245 is joined with the under surface of the plate member 201, and the chamber 202*j* communicates with the hollow of the reformed gas exhausting pipe 245. The reformed gas exhausting pipe 245 penetrates the heat insulating package 230 to extend to the outside of the heat insulating package 230. An air introducing pipe 242 is joined with the top surface of the plate member 213, and a chamber 212*j* communicates with the hollow of the air introducing pipe 242. The air introducing pipe 242 penetrates the heat insulating package 230 to extend to the outside of the heat insulating package 230.

The upper part laminated body 252 is made by putting each of frame members 215 and 217 between each of a plurality of plate members 214, 216, and 218, respectively, and by joining them. By the stacking of the plate members and the frame members 214-218, the upper and lower sides of the frame members 215 and 217 are covered, and chambers 215*j* and 217*j* are formed inside the frame members 215 and 217, respectively.

The plate member 216 is formed in a honeycomb, and a plurality of holes 216*g* are formed in the plate member 216. A reforming catalyst (for example, Pd/ZnO catalyst) is carried on both the surfaces of the plate member 216; the reforming catalyst is carried on the under surface of the plate member 218; and the reforming catalyst is carried on the top surface of the plate member 214. The upper part laminated body 252 is hereby functions as a reformer.

The upper end of the small diameter cylindrical tube section 272 is joined with the under surface of the plate member 214, and a chamber 215*j* communicates with the hollow of the small diameter cylindrical tube section 272. A pipe 231 intervenes between the plate member 214 and the plate member 213, and the chamber 215*j* and the chamber 212*j* communicate with each other through the pipe 231.

Moreover, a heating wire is patterned on the under surface of the plate member 214, and a combustor is provided at the upper part of the plate member 218. Thereby, the upper part laminated body 252 is heated by the heating wire and the combustor.

Next, the operation of the reaction device 200 is described.

The upper part laminated body 252 is heated by the combustor and the heating wire provided on the upper part laminated body 252, and the vaporizer pipe 270 and the lower part laminated body 251 are heated by the combustor and the heating wire provided around the vaporizer pipe 270.

Moreover, when a mixed liquid of a fuel and water is sent from the fuel cartridge 101 to a lower part opening of the vaporizer pipe 270, the mixed liquid is absorbed by the liquid absorbing material 273. The mixed liquid absorbed by the liquid absorbing material 273 permeates to the upper end of the liquid absorbing material 273 by the capillary phenomenon, and vaporizes by heat in the inside and the surface of the upper end in the neighborhood of the upper end of the liquid absorbing material 273. The mixture gas of the fuel and the water transpires from the upper end side of the liquid absorbing material 273 to the upper part.

The mixture gas that has transpires from the upper end side of the liquid absorbing material 273 passes through the small diameter cylindrical tube section 272 to be sent to the inside of the upper part laminated body 252. When the mixture gas is flowing in the chambers 215*j* and 217*j* of the upper part laminated body 252, hydrogen, carbon monoxide, and the like, are generated from the mixture gas by the operation of the reforming catalyst (if the fuel is methanol, the hydrogen, the carbon monoxide, and the like are generated in accordance with the chemical reaction formulae (1) and (2)).

The hydrogen gas and the like generated by the upper part laminated body 252 pass through the pipe 231 to be sent to the inside of the lower part laminated body 251. Furthermore, the external air passes through the air introducing pipe 242 to be sent to the inside of the lower part laminated body 251. When the gases sent from the upper part laminated body 252 to the lower part laminated body 251 are flowing through the chambers 202*j*, 204*j*, 206*j*, 208*j*, 210*j*, and 212*j*, carbon monoxide in the gases is preferentially oxidized by the catalyst, and the carbon monoxide is removed. The gases in the state in which the carbon monoxide has been removed pass through the reformed gas exhausting pipe 245 to be ejected. The gases are then sent to the fuel cell type generator cell.

By the insertion of the top end of the large diameter cylindrical tube section 271, which is a vaporizer, from the lower end of the lower part laminated body 251 to the inside thereof, the balance of the heat generated by the oxidization of carbon monoxide inside the lower part laminated body 251 and the heat used for vaporization in the liquid absorbing material 273 becomes good. Consequently, the lower part laminated body 251 and the large diameter cylindrical tube section 271 can be operated in a suitable temperature range (for example, 130-150° C.), and the temperature inside the lower part laminated body 251 does not become too hot to improve the efficiency of using heat. Moreover, a temperature distribution in which the temperature at the top end of the large diameter cylindrical tube section 271 is higher and the temperature at the bottom end is lower is produced in the large diameter cylindrical tube section 271, and the mixed liquid of the fuel and the water absorbed by the liquid absorbing material 273 becomes easy to evaporate in the neighborhood of the top end of the liquid absorbing material 273. Consequently, the quantity of the gas that has transpired from the liquid absorbing material 273 is stabilized.

As described above, because heat is generated by the oxidization of carbon monoxide in the carbon monoxide remover and the vaporizer is provided to be inserted inside the carbon monoxide remover, the heat generated in the carbon monoxide remover is used for the vaporization in the vaporizer, and the balance of the heat generation of the carbon monoxide remover and the heat absorption of the vaporizer becomes better. The heat generated by the carbon monoxide remover easily fills the inside of the carbon monoxide remover, and the temperature inside the carbon monoxide remover becomes easy to rise. But, because the vaporizer is provided to be inserted into the inside of the carbon monoxide remover, the temperature inside the carbon monoxide remover does not become a too high temperature. Consequently, the efficiency of using heat is improved.

The entire disclosure of Japanese Patent Application No. 2006-263127 filed on Sep. 27, 2006 including description, claims, drawings, and abstract are incorporated herein by reference.

Although various exemplary embodiments have been shown and described, the invention is not limited to the embodiments shown. Therefore, the scope of the invention is intended to be limited solely by the scope of the claims that follow.

What is claimed is:

1. A reaction device comprising:

a carbon monoxide remover to remove carbon monoxide; and a vaporizer to vaporize fuel;

wherein the carbon monoxide remover comprises a plurality of stacked plate members, including a first group of stacked plate members and a second group of stacked plate members;

wherein the vaporizer comprises a cylinder section inserted into the carbon monoxide remover in a direction substantially perpendicular to the plurality of stacked plate members, and the cylinder section is filled with a liquid absorbing material which absorbs liquid;

wherein the cylinder section has an outlet provided at a first end of the cylinder section, and an inlet provided at a second end of the cylinder section;

wherein the cylinder section extends into the inside of the carbon monoxide remover through only the first group of stacked plate members such that the outlet at the first end of the cylinder section is provided inside the carbon monoxide remover, and wherein the inlet at the second end of the cylinder section is provided outside the carbon monoxide remover.

2. The reaction device according to claim 1, further comprising a reformer to reform the fuel vaporized by the vaporizer to generate a reformation product.

3. The reaction device according to claim 2, wherein the carbon monoxide remover includes a flow path connected to the outlet of the cylinder section to discharge the fuel vaporized by the vaporizer to outside of the carbon monoxide remover, and a flow path to take in the reformation product from the reformer.

4. The reaction device according to claim 1, wherein:

frame members are positioned between each two of the stacked plate members; and each plate member located between the frame members among the plurality of stacked plate members is provided with a plurality of through holes.

5. The reaction device according to claim 4, wherein at least one of the plurality of through holes in the first group of stacked plate members is sized to accommodate a circumference of the cylinder section.

6. The reaction device according to claim 1, further comprising an electric heater to heat the carbon monoxide remover and the vaporizer, wherein the electric heater is provided inside the carbon monoxide remover.

7. The reaction device according to claim 1, further comprising a combustor to heat the carbon monoxide remover and the vaporizer, wherein the combustor is provided inside the carbon monoxide remover.

8. The reaction device according to claim 1, further comprising a combustor provided around the first end of the cylinder section inside the carbon monoxide remover, wherein the liquid absorbing material is filled up to a position corresponding to the combustor.

9. An electronic device comprising:

the reaction device of claim 1;

a reformer to reform the fuel vaporized by the vaporizer of the reaction device to produce a reformation product; and a fuel cell to generate electric power by using the reformation product;

wherein the electronic device is operated using the electric power generated by the fuel cell.

10. The reaction device according to claim 1, wherein:

each of the plates comprising the first group of stacked plate members includes a through hole adapted to accommodate a circumference of the cylinder section, such that the cylinder member is insertable therethrough; and each of the plates comprising the second group of stacked plates has a through hole smaller than the circumference of the cylinder section, such that the cylinder section is not insertable therethrough.

11. The reaction device according to claim 10, wherein the through holes in the first group of the stacked plate members and the through holes in the second group of the stacked plate members are concentric with each other.

* * * * *